US012690064B2

(12) United States Patent
Ciochina-Kar et al.

(10) Patent No.: US 12,690,064 B2
(45) Date of Patent: Jul. 21, 2026

(54) COMMUNICATION DEVICES AND METHODS

(71) Applicant: Sony Group Corporation, Tokyo (JP)

(72) Inventors: Dana Ciochina-Kar, Stuttgart (DE);
Thomas Handte, Stuttgart (DE);
Daniel Verenzuela, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 566 days.

(21) Appl. No.: 18/033,140

(22) PCT Filed: Oct. 29, 2021

(86) PCT No.: PCT/EP2021/080077
§ 371 (c)(1),
(2) Date: Apr. 21, 2023

(87) PCT Pub. No.: WO2022/090440
PCT Pub. Date: May 5, 2022

(65) Prior Publication Data
US 2023/0389069 A1 Nov. 30, 2023

(30) Foreign Application Priority Data
Oct. 30, 2020 (EP) .................................... 20204989

(51) Int. Cl.
*H04W 74/0808* (2024.01)
*H04L 5/00* (2006.01)
(52) U.S. Cl.
CPC ....... *H04W 74/0808* (2013.01); *H04L 5/0048* (2013.01)
(58) Field of Classification Search
CPC ......................... H04W 74/0808; H04L 5/0048
See application file for complete search history.

(56) References Cited

U.S. PATENT DOCUMENTS

2002/0085582 A1 7/2002 Kim
2012/0113829 A1* 5/2012 Olgaard ................. H04B 17/29
370/252

(Continued)

FOREIGN PATENT DOCUMENTS

JP 10-117213 A 5/1998
JP 2004-180101 A 6/2004

(Continued)

OTHER PUBLICATIONS

International Search Report and Written Opinion mailed on Mar. 4, 2022, received for PCT Application PCT/EP2021/080077, filed on Oct. 29, 2021, 9 pages.

(Continued)

*Primary Examiner* — Siren Wei
(74) *Attorney, Agent, or Firm* — XSENSUS LLP

(57) ABSTRACT

The present disclosure relates to the concept of preempting PPDUs, i.e., truncating a PPDU carrying non-latency sensitive traffic to serve STAs with latency constraints. A first communication device comprises circuitry configured to listen to an ongoing data exchange between a second communication device and a third communication device on a wireless channel, to estimate a reception duration of a data unit, to determine if the transmission of the data unit is truncated and/or if a truncation condition is met, the reception duration indicating the time of reception of the data unit by the third communication device if the data unit were not truncated, and, if the transmission of the data unit is truncated and/or if a truncation condition is met, receive a preemptive data unit from the second communication device or transmit a preemptive data unit to the second communication device.

20 Claims, 15 Drawing Sheets

(56)  References Cited

U.S. PATENT DOCUMENTS

| | | | |
|---|---|---|---|
| 2015/0289293 A1 | 10/2015 | Zhang et al. | |
| 2016/0352601 A1* | 12/2016 | Zhang ................ | H04L 43/0829 |
| 2020/0162357 A1* | 5/2020 | Zacks .................... | H04L 43/04 |

FOREIGN PATENT DOCUMENTS

| | | | |
|---|---|---|---|
| JP | 2010278810 A | 12/2010 | |
| WO | 2020/174015 A1 | 9/2020 | |
| WO | 2021/136662 A1 | 7/2021 | |

OTHER PUBLICATIONS

"Part 11: Wireless LAN Medium Access Control (MAC) and Physical Layer (PHY) Specifications", IEEE Computer Society, IEEE Std 802.11™-2016, Dec. 7, 2016, pp. 1-3530.

Adrian Stephens (Intel Corporation), "Joint Proposal: High throughput extension to the 802.11 Standard: MAC", IEEE 802.11-05/1095r3, IEEE, Jan. 9, 2006.

Shubhodeep Adhikari et al., Proposals on Latency Reduction, IEEE 802.11-20/0005r1, IEEE, Mar. 15, 2020.

IEEE Standard for Information technology—Telecommunications and information exchange between systems, Local and metropolitan area networks—Specific requirements; Part 11: Wireless LAN Medium Access Control (MAC) and Physical Layer (PHY) Specifications; IEEE Std 802.Nov. 2016; IEEE Computer Society; Dec. 7, 2016.

* cited by examiner

1

COMMUNICATION DEVICES AND METHODS

CROSS-REFERENCE TO RELATED APPLICATIONS

The present application is based on PCT filing PCT/EP2021/080077, filed Oct. 29, 2021, which claims priority to EP 20204989.6, filed on Oct. 30, 2020, the entire contents of each of which are incorporated herein by reference.

BACKGROUND

Field of the Disclosure

The present disclosure relates to first and second communication device for communication there between. The present disclosure relates further to corresponding communication methods.

Description of Related Art

WLAN, as defined in IEEE 802.11-2016, implements packet-based data transmission. When one or more input data packets or MSDUs (MAC layer service data unit) are present and the wireless channel is free, these MSDUs are processed by the MAC layer to one or more MPDUs (MAC layer protocol data unit) and by the PHY layer, before they are transmitted to one or more peer WLAN communication device as PPDUs (physical layer protocol data unit).

Certain restrictions apply to the length of such a PPDU, measured on the wireless channel. These restrictions limit the maximum length or transmit time to a range from 2 ms to 10 ms (sometimes 20 ms) depending on the considered standard. The transmit time is determined and fixed at the beginning of a PPDU transmission. A long transmit time is favorable for high efficiency in communications as the overhead for gaining channel access, preamble transmission, and/or control frame transmission gets negligible.

In the context of low-latency communications, an access point (AP) or a station (STA) may want to transmit both non-latency sensitive and latency sensitive data packets. Often, the arrival of a latency sensitive packet is random, unknown, and unpredictable. Thus, it may happen that a transmission of one or more non-latency sensitive MSDUs has just started when one or more latency sensitive MSDUs arrive. According to the current WLAN behavior, the ongoing PPDU transmission is required to finish before a new PPDU transmission that conveys the latency sensitive MSDUs can be initiated. Thus, the latency sensitive MSDUs may need to wait unacceptably long for their transmission.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

SUMMARY

It is an object to provide communication devices and methods that deal in an improved manner and with correct behavior with situations where a data exchange is ongoing when e.g. a latency sensitive data unit arrives from a different communication device than the one with which the ongoing data exchange is performed. It is a further object to provide a corresponding computer program for implementing a communication method and a non-transitory computer-readable recording medium for implementing a communication method.

According to an aspect there is provided a first communication device configured to communicate with a second communication device, the first communication device comprising circuitry configured to listen to an ongoing data exchange between the second communication device and a third communication device on a wireless channel, estimate from a packet comprising a data unit transmitted during the ongoing data exchange to the third communication device the reception duration of the data unit, determine, before the end of the estimated reception duration of the data unit, if the transmission of the data unit is truncated and/or if a truncation condition is met, the reception duration indicating the time of reception of the data unit by the third communication device if the data unit were not truncated, and if the transmission of the data unit is truncated and/or if a truncation condition is met, receive a preemptive data unit from the second communication device or transmit a preemptive data unit to the second communication device.

According to a further aspect there is provided a second communication device configured to communicate with a first and third communication device, the second communication device comprising circuitry configured to perform an ongoing data exchange with the third communication device on a wireless channel, truncate the transmission of a data unit to the third communication device, and, before the end of the estimated reception duration, initiate reception of a preemptive data unit from the first communication device or transmission of a preemptive data unit to the first communication device, the reception duration indicating the time of reception of the data unit by the third communication device if the data unit were not truncated.

According to still further aspects corresponding first and second communication methods, a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Embodiments are defined in the dependent claims. It shall be understood that the disclosed communication methods, the disclosed computer program and the disclosed computer-readable recording medium have similar and/or identical further embodiments as the claimed communication devices and as defined in the dependent claims and/or disclosed herein.

One of the aspects of the disclosure is the concept of preempting PPDUs, i.e., truncating a PPDU carrying non-latency sensitive traffic to serve STAs with latency constraints. A further aspect deals with enhancements to enable correct behavior at the STA which is the reason for truncation i.e., the STA which requires the immediate update or from which an immediate update is required. Furthermore, the disclosed techniques for correct behavior enable the communication device to which low latency sensitive data is sent to correctly understand that an intentional truncation has been performed and which is the intended recipient of a subsequent transmission of data.

In the context of the present disclosure, the first communication device is also called "preemptive station" or "pSTA", the second communication device is also called "access point" or "AP", and the third communication device is also called "starting station" or "sSTA".

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
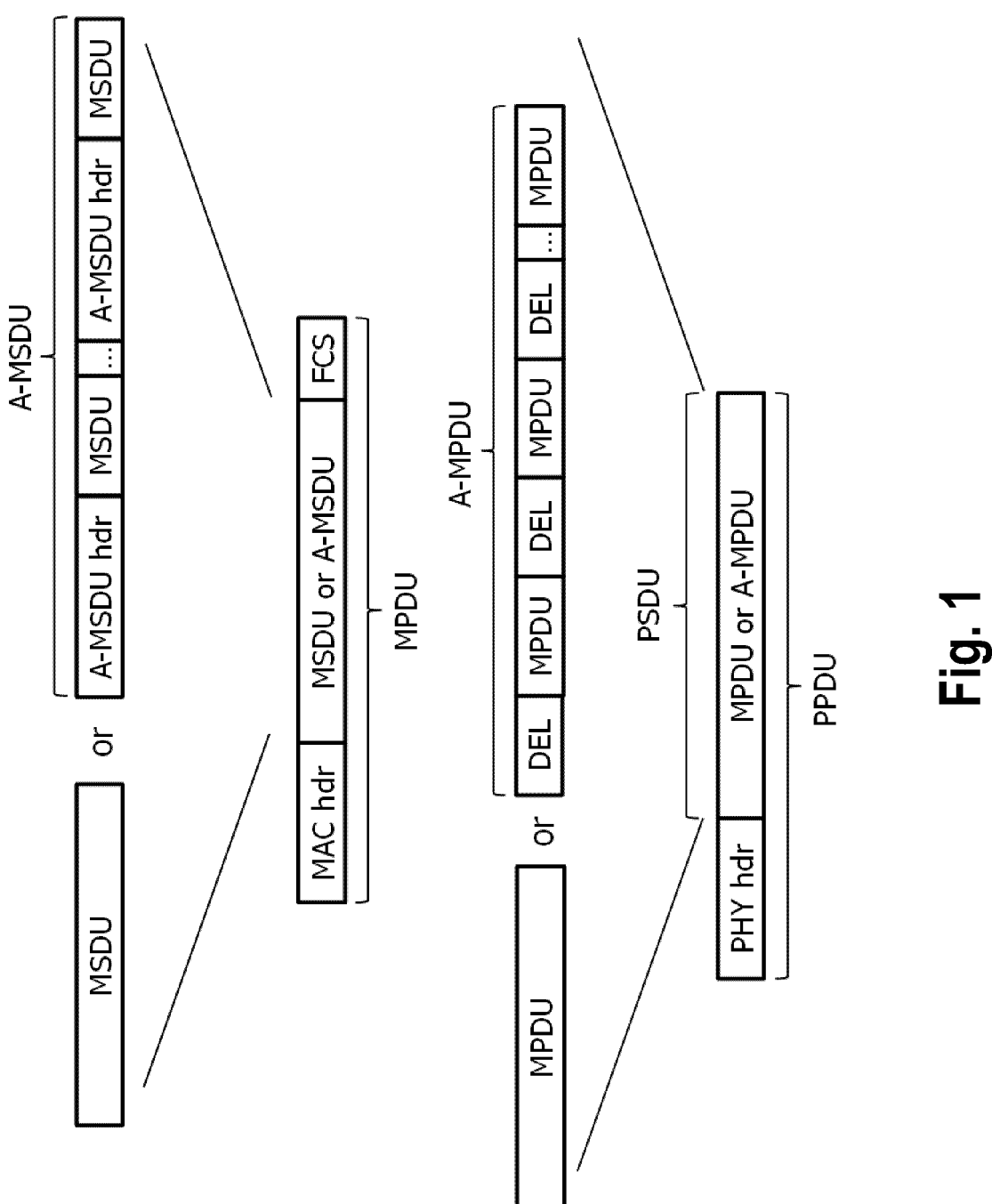
FIG. 1 shows a diagram illustrating the relation and construction of data units in conventional WLAN.

Referring now to the drawings, wherein like reference numerals designate identical or corresponding parts throughout the several views, FIG. 1 shows the generally known relation and construction of data units in WLAN, in particular of MSDUs or A-MSDUs (aggregated MSDUs), MPDUs, PSDUs (physical layer service data units) and PPDUs.

According to the present disclosure a PPDU transmission, i.e. a transmission of a data unit, shall be truncated (or interrupted) without losing data that has already been transmitted. It can thus be considered as a receiver friendly truncation of an ongoing PPDU transmission.

Figures 2, 3:
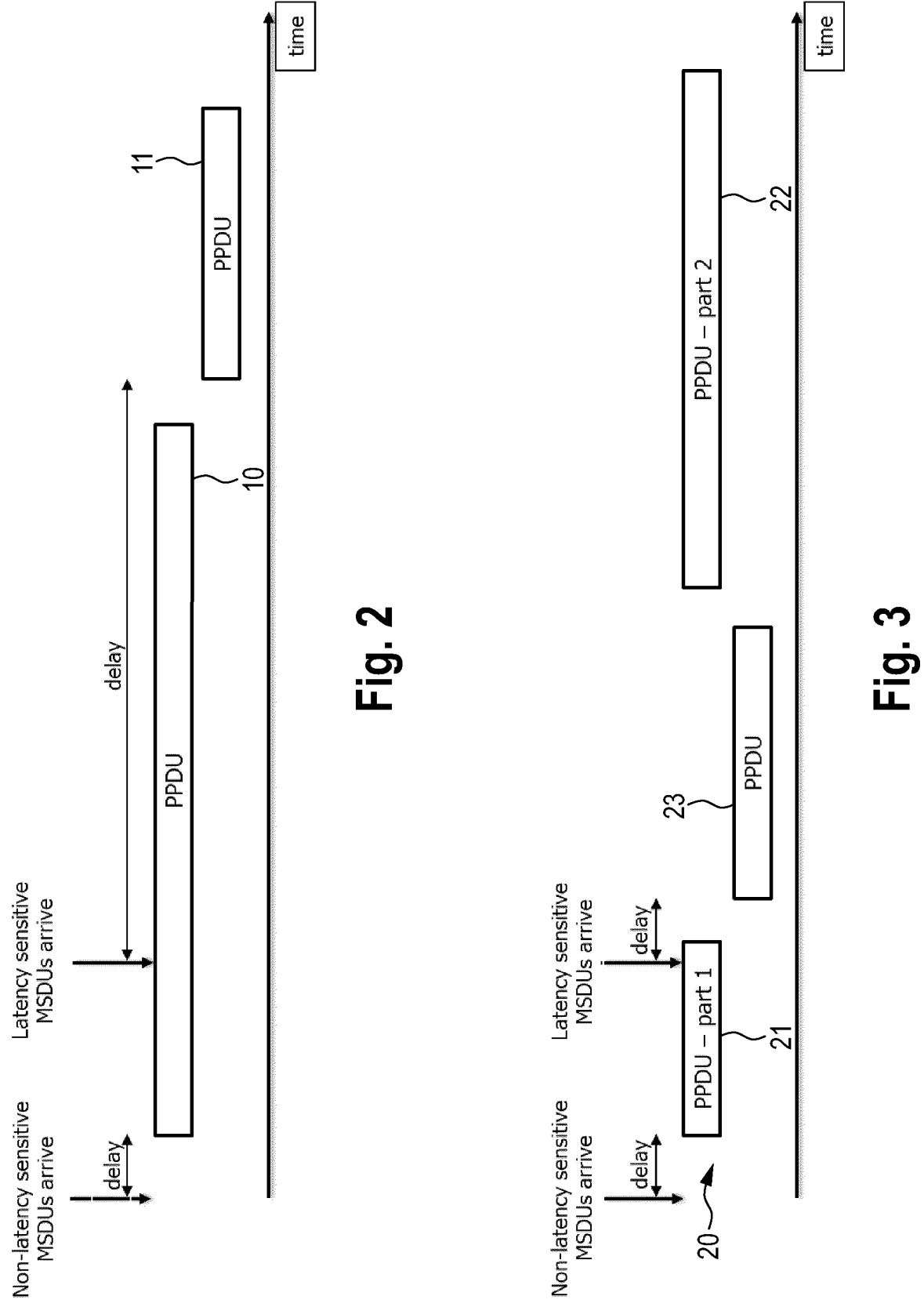
FIG. 2 shows a diagram illustrating non-latency and latency sensitive data transmission without PPDU truncation.
FIG. 3 shows a diagram illustrating non-latency and latency sensitive data transmission with PPDU truncation.

FIGS. 2 and 3 show diagrams illustrating the benefit of PPDU truncation with respect to low latency communications. According to FIG. 2 PPDU truncation is not used; according to FIG. 3 PPDU truncation is used. It shall be noted that both figures illustrate the conventional WLAN behavior and that the MSDU arrival times are equal in both figures.

According to FIG. 2, the PPDU 10 holding the non-latency sensitive MSDUs is required to be finished before the latency sensitive MSDUs held in the PPDU 11 can be transmitted. This causes an unwanted queuing delay for the latency sensitive MSDUs because the latency sensitive MSDUs need to be buffered in a queue or memory until they can be transmitted. According to FIG. 3, however, the truncation of the PPDU 20 holding non-latency sensitive data into two PPDU parts 21 and 22 allows for a speedy transmission of the PPDU 23 holding the latency sensitive data. Thus, the queuing delay of the latency sensitive MSDUs is smaller compared to FIG. 2. The queuing delay of the non-latency sensitive data increases in FIG. 3 compared to FIG. 2 PPDU truncation can provide a trade-off of queuing delay of different traffic types but not a reduction. It should be noted that non-latency sensitive and latency-sensitive MSDUs may target different STAs.

Within WLAN PHY and MAC layer signal processing may in an embodiment be done block-wise. Several processing steps have different block lengths. The block lengths that may be respected for the envisioned PPDU truncation operation are LDPC code word length, OFDM symbol length, and MPDU data unit.

The MPDU data unit consists of (i) header information, (ii) (encrypted) user data, often MSDU, and (iii) frame check sequence (FCS). The FCS is used to detect transmission errors within the user data and/or header information. In case an error is detected, the MPDU is discarded and a retransmission may be requested from the transmitter of that MDPU. One or more MPDUs may be aggregated to an A-MPDU for transmission in a single PPDU (FIG. 1). Once the PSDU, i.e. MPDU or A-MPDU, is readily available in the MAC layer, i.e. at least the amount of data to be transmitted is known, the PHY layer is triggered for transmission.

Figure 4:
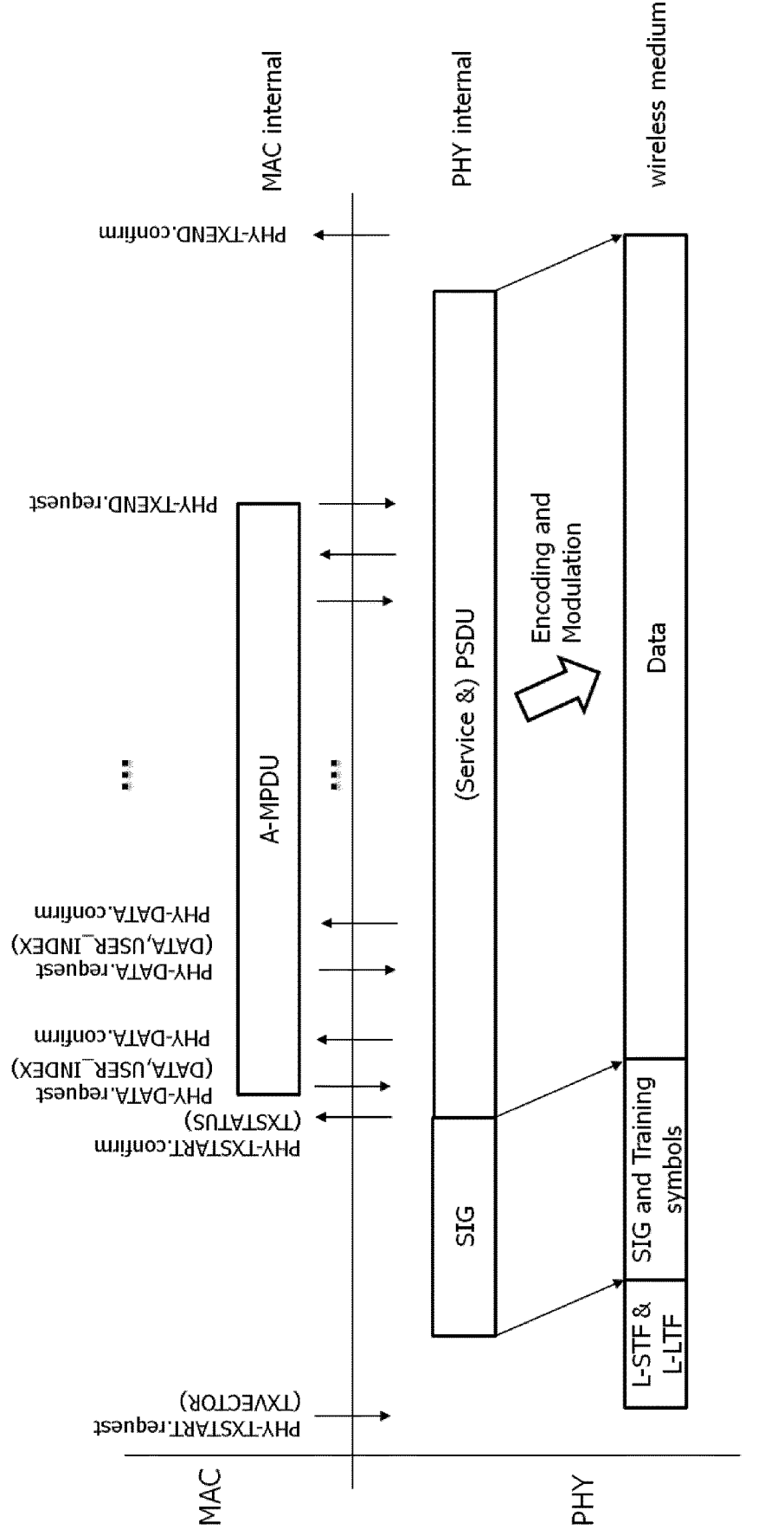
FIG. 4 shows a diagram illustrating the interaction between PHY and MAC for a transmission in WLAN.

FIG. 4 shows the interaction between PHY and MAC for a transmission, i.e. initiation of a PPDU transmission and data transfer between MAC and PHY. The MAC triggers the PHY to start transmission by PHY-TXSTART.request (TXVECTOR) function (or primitive). This request includes the TXVECTOR which holds one or more configuration parameters for the PHY such as length information of PHY input data unit (PSDU), modulation coding scheme (MCS), i.e. code rate and constellation diagram size, number of spatial streams, MIMO mode, bandwidth and RU size, etc.

Figure 5:
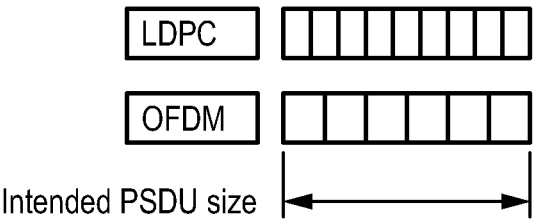
FIG. 5 shows a diagram illustrating block sizes in the PHY layer.

Based on this information the PHY determines block sizes for LDPC and OFDM modulation and their respective structure. This process holds various steps and is omitted here because this is not part of the disclosed solution. The different block sizes are determined such that at least at the end (and preferably at the beginning as well) of the PSDU the borders of all blocks coincide. These block sizes and related block structures are kept fixed during the entire encoding and modulation process for the respective PPDU. FIG. 5 visualizes the block-wise operation and coincidence of block borders at the beginning and end of a PSDU.

In FIG. 4, following the PHY-TXSTART.request and block size computation, the PHY starts transmitting channel estimation sequences (STF, LTF) and training symbols as well as signaling information (SIG). The signaling information is used by the receiver to configure its PHY for reception of that PPDU. Once the SIG field data is compiled, the PHY reports to the MAC its readiness for data exchange by issuing the PHY-TXSTART.confirm (TXSTATUS) primitive. Following that, the MAC sends data to the PHY by using the PHY-DATA.request (DATA, USER_INDEX) primitive. Thereby, DATA holds the actual data to be transmitted for the user identified by USER_INDEX. Often, the DATA is of size 1 octet. The PHY confirms successful data transfer by issuing the PHY-DATA.confirm primitive. The data exchange continues until the MAC issues the PHY-TXEND.request indicating to the PHY to terminate transmission. After that the PHY notifies the MAC that transmission ended by PHY-TXEND.confirm once it does not transmit on the wireless medium anymore.

In the context of real time application (RTA), an AP needs to service STAs within its basic service set (BSS) that have stringent constraints in point of latency and jitter. On the other hand, PPDUs defined currently in WLAN can have relatively long transmission times e.g., up to 5 ms. Therefore, the concept of preempting PPDUs, i.e., truncating a PPDU carrying non-latency sensitive traffic to serve STAs with latency constraints has emerged. A truncation of the PPDU transmission may be performed by the MAC at any time by the PHY-TXEND.request primitive. However, truncating in this manner may lead to an incomplete last OFDM symbol, which may thus partially damage the PPDU, so that it may not be demodulated by the receiver and may thus result in data loss. Furthermore, it is not clear to the receiver what caused the PPDU truncation; e.g., it could be carrier loss, interference as well as an intentional truncation. In order to enable a receiver to correctly decode the content of the PPDU up to the truncation, in case of an early termination of a PPDU, specific padding techniques may be used.

When an AP truncates a data unit towards a STA in order to perform a data exchange with another STA, performing a truncation according to the existing methods may not only be detrimental for the former STA which is the initially intended receiver of the PPDU, due to the data loss mentioned above, but also to the latter STA, for which the truncation is performed. In the present disclosure, enhancements are presented to enable correct behavior at the STA, which is the reason for truncation, i.e., the STA which requires the immediate update or from which an immediate update is required.

Figure 6:
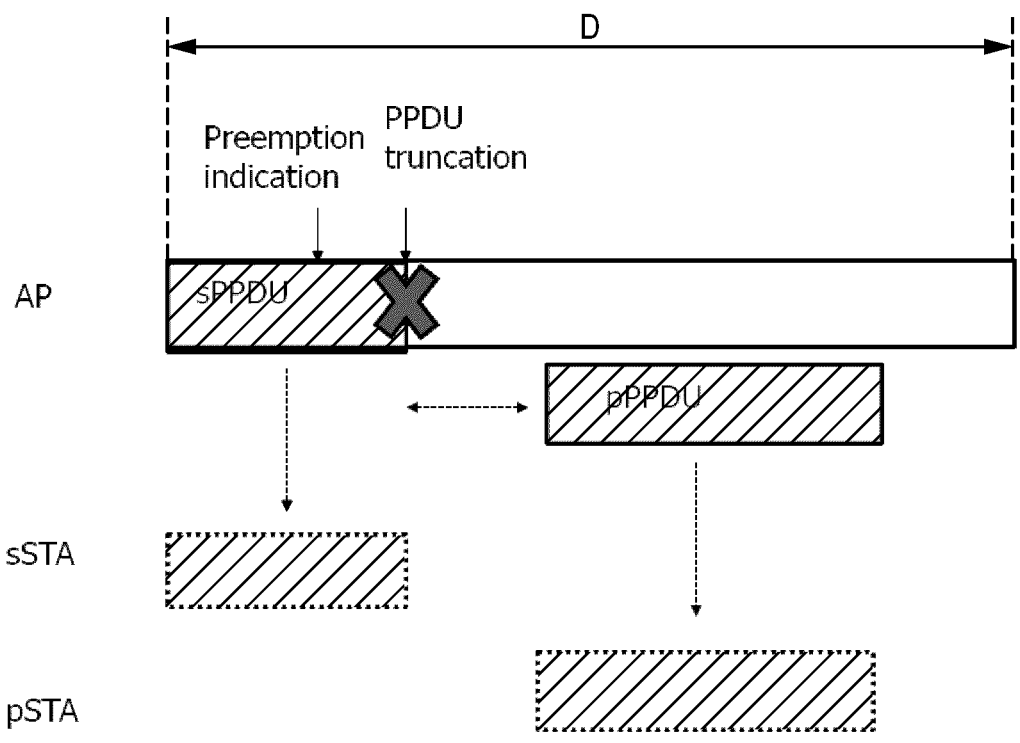
FIG. 6 schematically shows a first scenario for application of the present disclosure.
Figure 7:
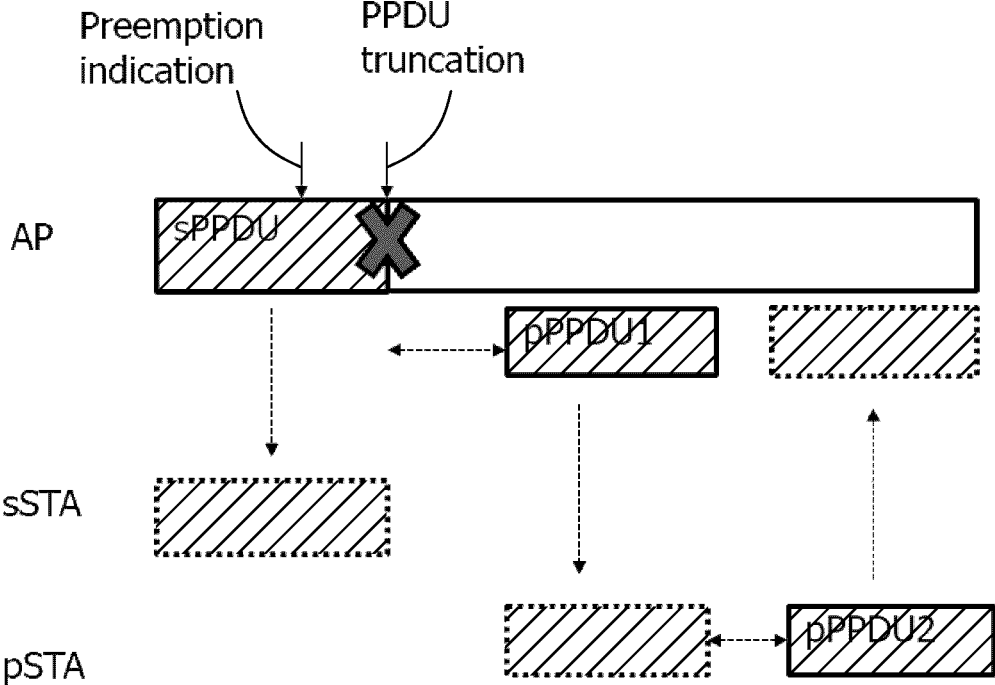
FIG. 7 schematically shows a second scenario for application of the present disclosure.
Figure 8:
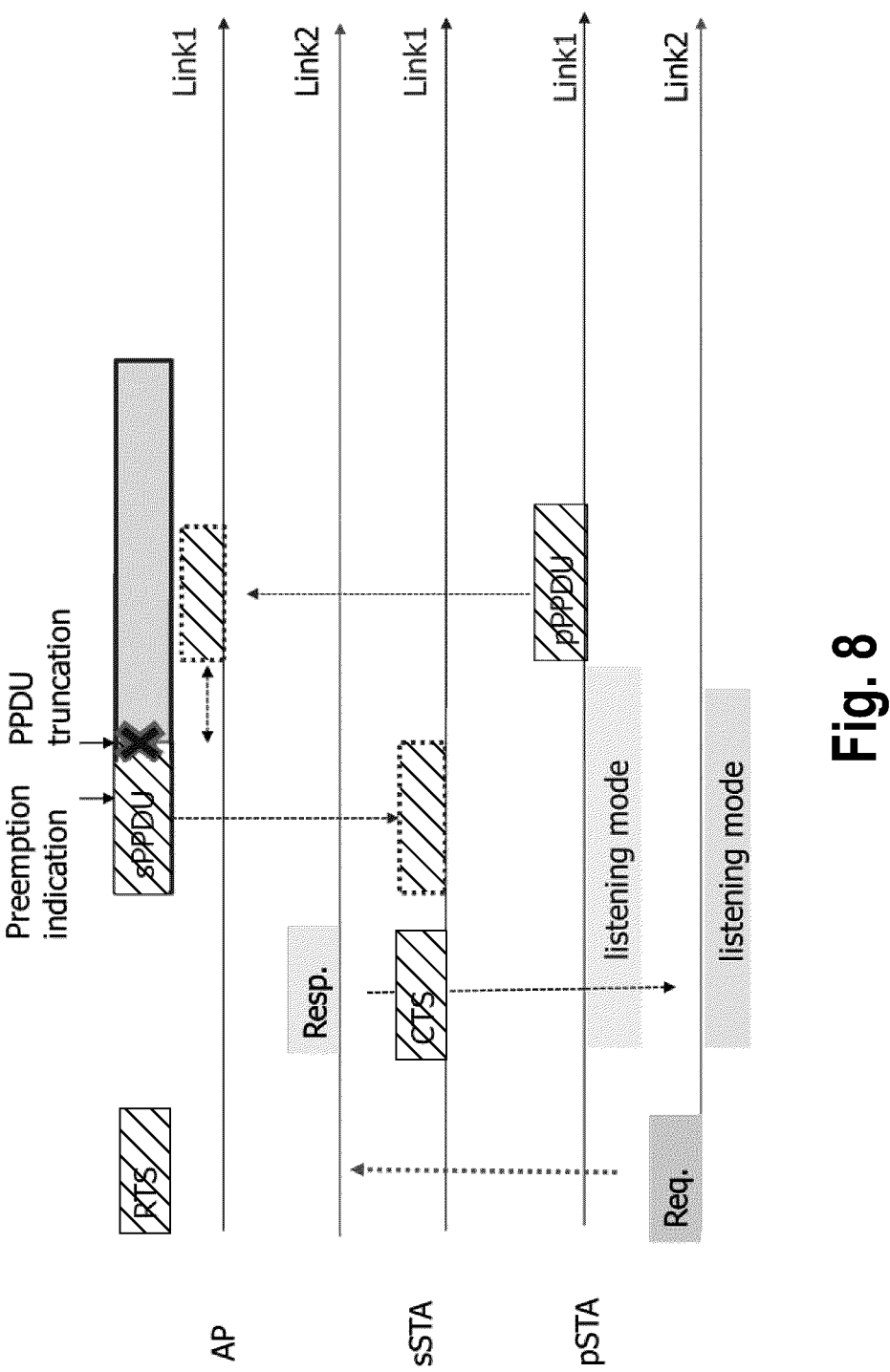
FIG. 8 schematically shows a third scenario for application of the present disclosure.

The scenarios that are considered hereinafter are depicted in FIGS. 6 to 8.

A first scenario using downlink (DL) PPDU truncation for DL transmission to a preemptive STA (pSTA) is schematically depicted in FIG. 6. In this scenario the AP (herein also called second communication device) sends a PPDU (herein generally also called starting data unit or sPPDU) towards an initial STA (herein also called third communication device or starting STA, sSTA). At a certain point during the sPPDU transmission, the upper layers of the AP indicate the need to send high priority data to a different STA (herein also called first communication device or pSTA). As a result, after a processing delay (pDelay), the sPPDU is truncated, the transmission to the sSTA is stopped and after a given time interval, interframe space (IFS) the AP sends a new PPDU (herein also called preemptive data unit or pPPDU) to pSTA. In FIG. 6 the duration D is shown, which indicates the originally intended transmission time of the sPPDU to the sSTA 300. Thus, D indicates the duration of the sPPDU in case no truncation is performed. The duration D of the originally intended sPPDU can be estimated by the STAs which are able to decode the preamble of the sPPDU, i.e., sSTA 300 and pSTA 100, for instance from information present in the preamble fields.

A second scenario using DL PPDU truncation for uplink (UL) transmission from a pSTA is schematically depicted in FIG. 7. This scenario is an extension of the first scenario, wherein the main difference is that not only the DL transmission from the AP occurs after the truncation but also a response from the pSTA. This scenario is depicted in a general sense and covers e.g. the following particular cases:

i) The first pPPDU (pPPDU1) sent by the AP contains high priority data towards pSTA with normal/implicit Ack policy and/or aggregated with a BAck Request frame, while pPPDU2 contains an Acknowledgement or Block Acknowledgment.

ii) The AP requires an urgent update from pSTA and interrupts the transmission to the sSTA to send a frame to the pSTA by which a data transmission from the pSTA is requested. In this case the first PPDU pPPDU1 contains a frame, which triggers or schedules a second pPPDU pPPDU2, which contains the actual data from pSTA. The pPPDU1 can be a Trigger Frame (TF), as defined e.g., in IEEE 802.11ax, triggering the transmission of pPPDU2, or a simplified version of this but with similar functionality. (e.g., comprising a start indication and basic RU/BW allocation).

iii) The AP has received an indication from a different link from a pSTA that it has urgent data to transmit. Thus, the AP allows the transmission after preempting the sPPDU and sends the TF to trigger the transmission from pSTA. For this case the content of the pPPDU1 and pPPDU2 is a trigger frame and the data PPDU respectively.

When the STAs have multi-link capabilities and the preemption request is performed over a different link than the one where the transmission will occur, the TF frame as presented in case iii) can be an easy implementation as it can ensure correct channel access and consistent duration information on the link. However, it also incurs delays so that an operation without it can also be desired when latency requirements are strict. Thus, a third scenario may be considered using Direct UL access for pPPDUs after sPPDU truncation as schematically depicted in FIG. 8.

One requirement in this case is that the pSTA listens to the link, where the truncation will be performed at least since the beginning of the sPPDU, such that it has decoded the preamble information. The mechanism of requesting preemption over a link different than the one where the DL transmission and the truncation is performed is out of the scope of this disclosure. However, for completeness an example of the multi-link relations in FIG. 8 as well. The focus here is only on ensuring the transmit opportunity (TXOP) consistency on the specific link.

In order to ensure a correct behavior for the scenarios depicted in FIGS. 6 to 8, pSTA awareness should be ensured. The pSTA should be aware of the fact that a PPDU may be truncated and should continue listening to the medium at one or more time intervals during the PPDU transmission, even when the pSTA is not the initially intended recipient of the PPDU. A pSTA not being able to receive the transmission from the AP after the truncation may be detrimental for both pSTA and sSTA, for which reason such a case should be avoided.

Figure 9:
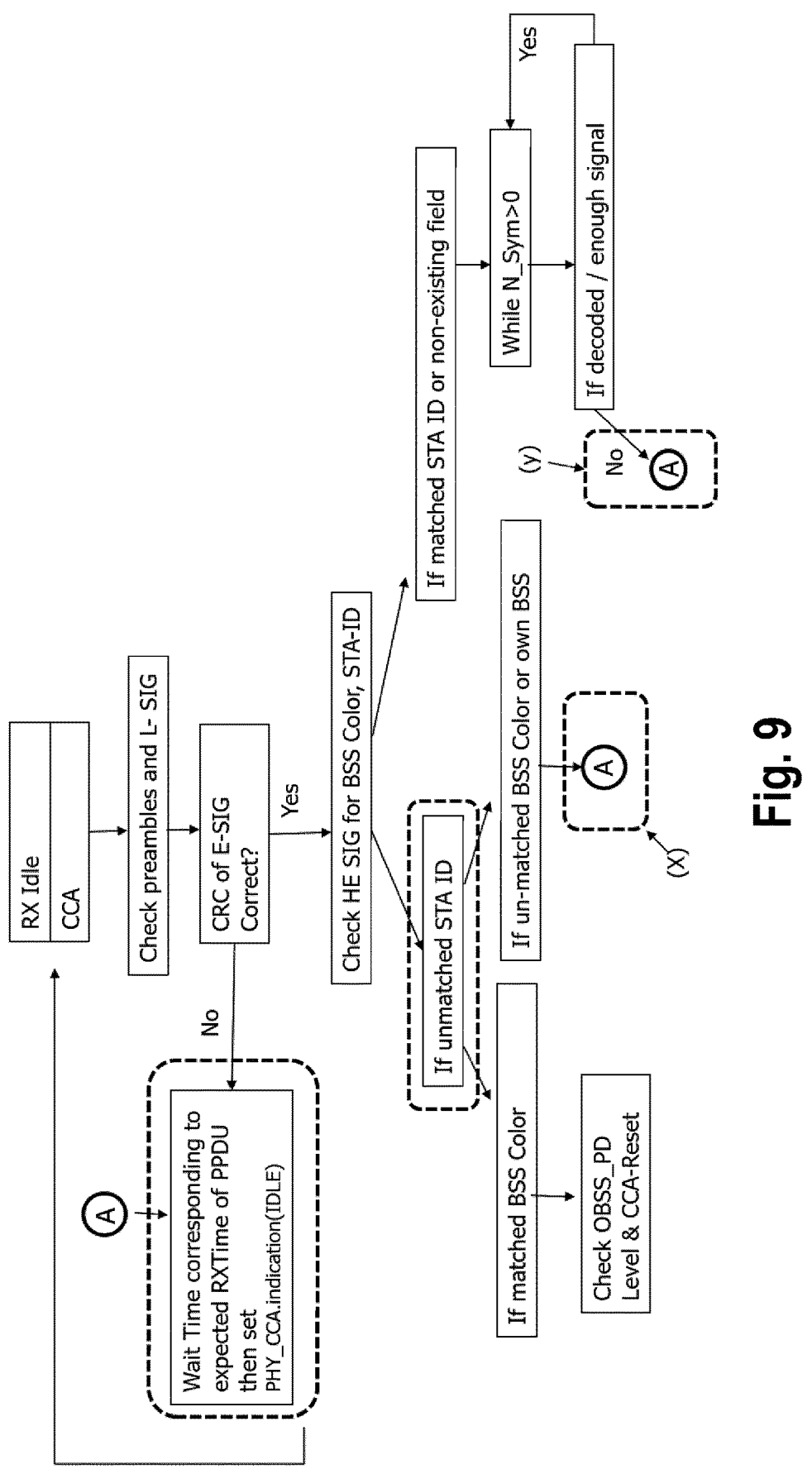
FIG. 9 schematically shows a flow chart of some of the steps of a receiver procedure as defined in an IEEE 802.11 standard.

However, in this respect there are a number of current limitations:

i) The current receiver PHY procedure is defined in the IEEE 802.11 amendments and depicted in FIG. 9. According to this procedure, after receiving a PPDU which a STA identifies as not being of interest to itself, e.g. based on preamble information such as STA-ID or BSS color information, the STA stops decoding the rest of the PPDU and waits for a time interval equaling RXTIME to reassess if the medium is idle or not and process further PPDUs. RXTIME is the estimated duration of the received PPDU and is computed individually by each receiving STA based on information in the PHY preamble. This corresponds to the duration marked with D in FIG. 6. Thus, a pSTA may not be able to decode the PPDU for which the AP has interrupted the sSTA transmission. The block that is addressed by an aspect of the present disclosure is indicated by "(X)" in FIG. 9.

ii) For PPDUs where STA-ID information is not present, (e.g., single-user (SU) PPDU) a STA may continue decoding the information within the MAC Headers. If, based on the header information and more specifically the receiver address (RA) within this field, it determines that it is not the intended recipient of the PPDU, it may also stop further decoding the content after retrieving the duration information.

iii) Finally, even if a PPDU is not discarded based on STA ID in PHY preamble or RA information in the MAC Header and continues listening, a premature stopping due to smaller number of symbols received than expected also results in a wait time equal to the estimated duration of the PPDU, before any action can be taken by the pSTA. Thus, the pSTA would again be unable to process a transmission following the truncation, as long as this is initiated by the AP before the estimated reception end of the sPPDU.

Figure 10:
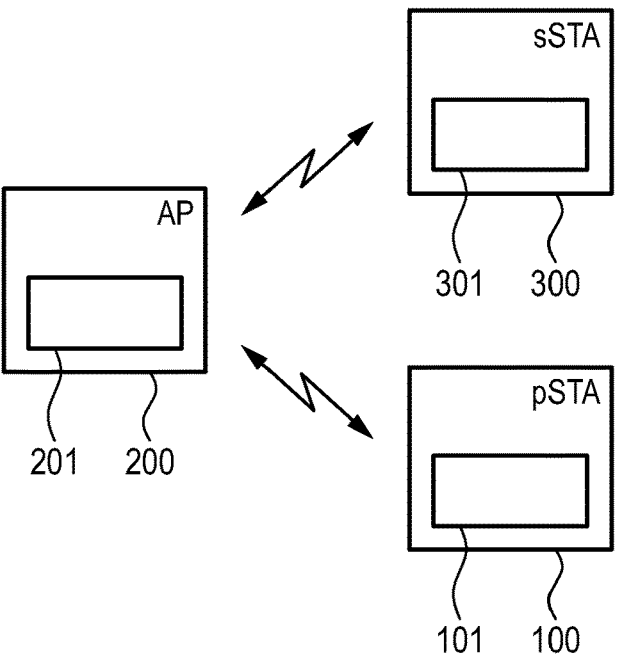
FIG. 10 shows a schematic diagram of communication devices according to the present disclosure.

FIG. 10 shows a diagram illustrating a first communication device 100 (herein also called preemptive station, pSTA) according to an aspect of the present disclosure for communicating with a second communication device 200 (e.g. an access point, AP). The second communication 200 is able to exchange (receive and/or transmit) data with the first communication device 100 and a third communication device 300 (herein also called start station, sSTA) on a wireless channel.

Each of the communication devices 100, 200, 300 comprises circuitry 101, 201, 301 configured to perform particular operations. The circuitries may be implemented by a respective processor or computer, i.e. as hardware and/or software, or by dedicated units or components. For instance, respectively programmed processors may represent the respective circuitries 101, 201, 301.

Figure 11:
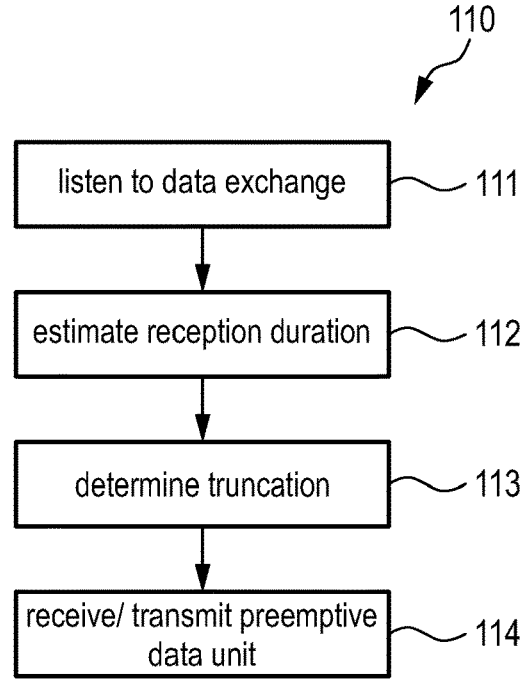
FIG. 11 shows a flow chart of an embodiment of a communication method of the first communication device according to the present disclosure.

FIG. 11 shows a flow chart of an embodiment of a first communication method 110 of the first communication device 100 (the pSTA) according to the present disclosure, which may be performed of by the circuitry 101. In a first step 111 the pSTA 100 listens to an ongoing data exchange between the AP 200 and the sSTA 300 on a wireless channel. In a second step 112 the pSTA 100 estimates from a packet comprising a starting PPDU (sPPDU) transmitted (by the AP 200) during the ongoing data exchange to the sSTA 300 the reception duration of the sPPDU. Before the end of the estimated reception duration of the sPPDU, it is determined by the pSTA 100 in a third step 113 if the transmission of the sPPDU is truncated and/or if a truncation condition is met. Hereby, the reception duration indicates the time of reception of the sPPDU by the sSTA 300 if the sPPDU were not truncated. Finally, in a fourth step S114, if the transmission of the PPDU is truncated and/or if a truncation condition is met, the pSTA 100 receives a preemptive PPDU (pPPDU) from the AP 200 or transmits a pPPDU to the AP 200.

In this context, the truncation condition may consist in verifying one or more of the following:

the truncation is intentional (i.e., an ongoing data exchange was purposefully truncated to allow a transmission with a higher priority.

the pSTA 100 is eligible to receive from or transmit to the AP 200 before the estimated reception duration of the sPPDU elapses. Hereby, that the pSTA 100 is eligible to receive/transmit data means that the pSTA 10 has indicated capability of determining truncations and reacting to early PPDU terminations and/or is involved in a low latency traffic session, during which truncation may be performed and/or has negotiated a set of preemption parameters with the AP 200 prior to the data exchange.

Figure 12:
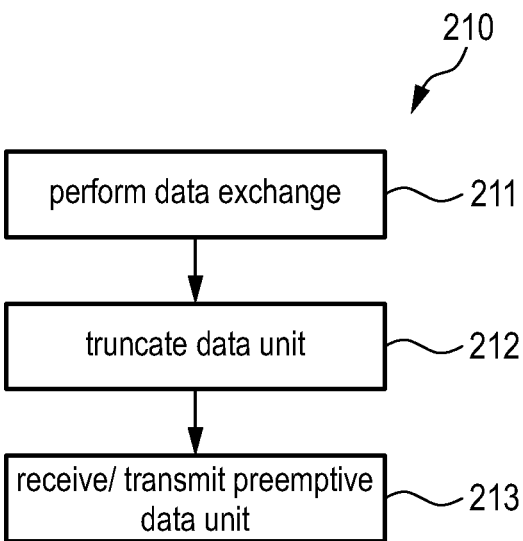
FIG. 12 shows a flow chart of an embodiment of a communication method of the second communication device according to the present disclosure.

FIG. 12 shows a flow chart of an embodiment of a second communication method 210 of the second communication device 200 (the AP) according to the present disclosure, which may be performed of by the circuitry 201. In a first step 211 the AP 200 performs an ongoing data exchange with the sSTA 300 on a wireless channel. In a second step 212 the AP 200 truncates the transmission of a sPPDU to the sSTA 300. After an interframe space interval from the end of the truncate sPPDU, the AP 200 receives a pPPDU from the pSTA 100 or transmits a pPPDU to the pSTA 100.

When truncating the PPDU, the AP 200 should ensure that the OFDM symbol boundaries are respected. Furthermore, for maintaining an efficient operation of the sSTA 300, it is beneficial to perform the truncation such that complete MPDUs are present in the sPPDU. If only a part of an MPDU is sent, and no fragmentation is indicated, the recipient can detect an error and request a retransmission of the MPDU. However, this comes with additional delays. In a typical operation, with moderate MCS and MPDU sizes, an MPDU may span several OFDM symbols. However, for very advanced PHY configuration it can happen that several MPDUs can be included within an OFDM symbol.

Based on the sizes of the MPDUs and requirements on latency constraints an AP may only perform truncation after an integer number of OFDM symbols, in which case this number can be signaled, e.g. in a SIG field of a preamble or in a previously negotiation phase. Based on this information, a pSTA must ensure to be listening to the medium periodically during the transmission of the PPDU at least at time intervals determined based on the granularity of the truncation, the IFS and the reception duration of the PPDU. In an embodiment, the pSTA may listen to channels after $$\text{Wait\_time } (i) = \begin{cases} \text{Wait}_{time(i-1)} + NxOFDM_{duration}, & \text{if } i > 1 \quad (1) \\ RXTIME \text{ (Preamble)} + NxOFDM_{duration} & \text{if } i = 1 \end{cases}$$

from the start of sPPDU, where i denotes an index within one PPDU. Wait_time(1) indicates the first time from the start of the PPDU when a truncation may occur and corresponds to the duration of the preamble+N OFDM Symbols.

Similarly a second time when a truncation may occur is duration of preamble+2N OFDM Symbols, according to equation (1). The periodic listening time can e.g. be a CCATime. The PHY should ensure that appropriate padding is used such that the MPDUs are aligned to the boundaries of the N blocks of OFDM symbols, indicated as truncation granularity. If this cannot be guaranteed, and padding is done on individual OFDM symbol basis, the listening time should be defined such that it can capture plus/minus one OFDM symbol duration.

Figure 13:
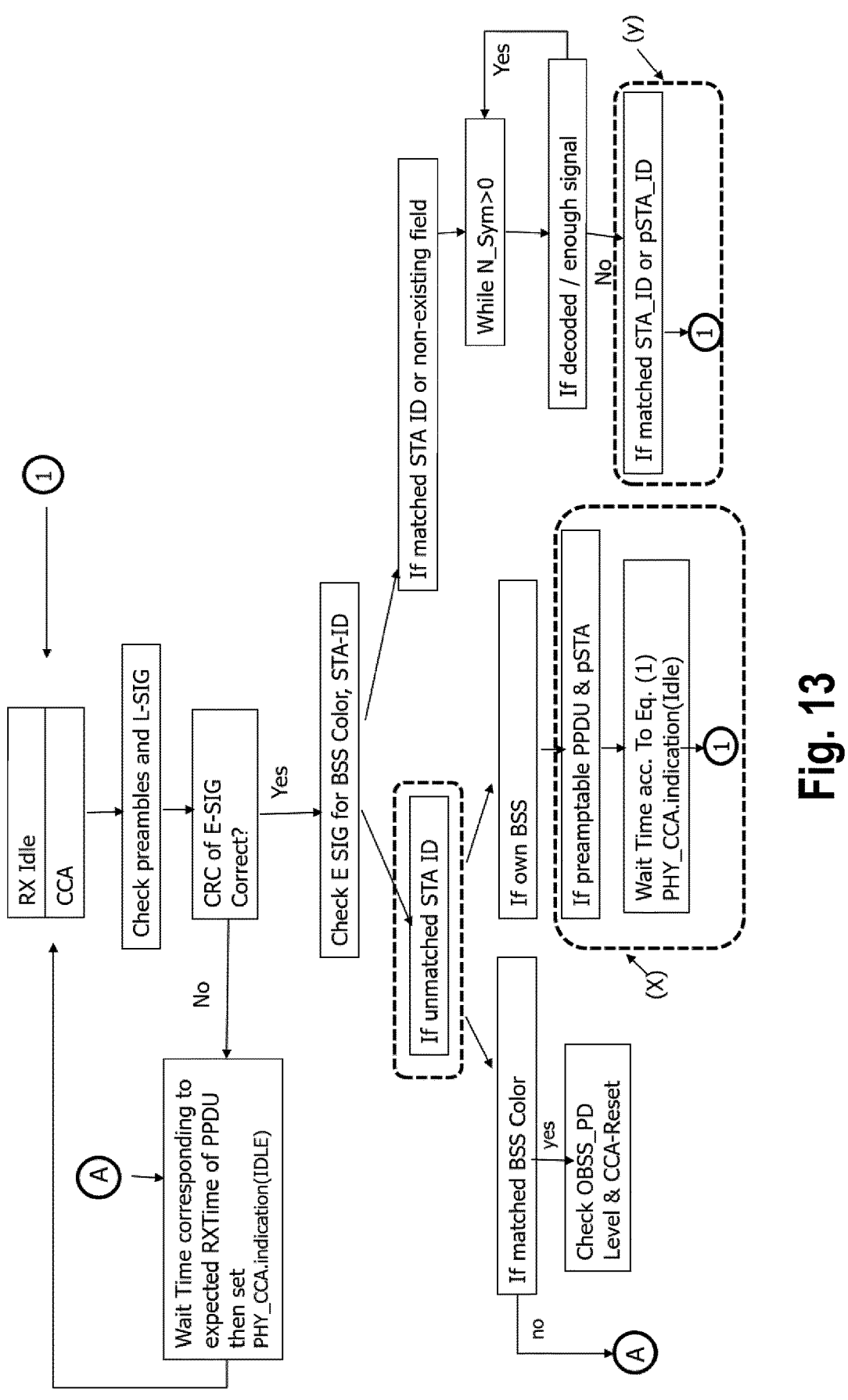
FIG. 13 schematically shows a modified flow chart of some of the steps of a receiver procedure as defined in an IEEE 802.11 standard.
Figure 14A:
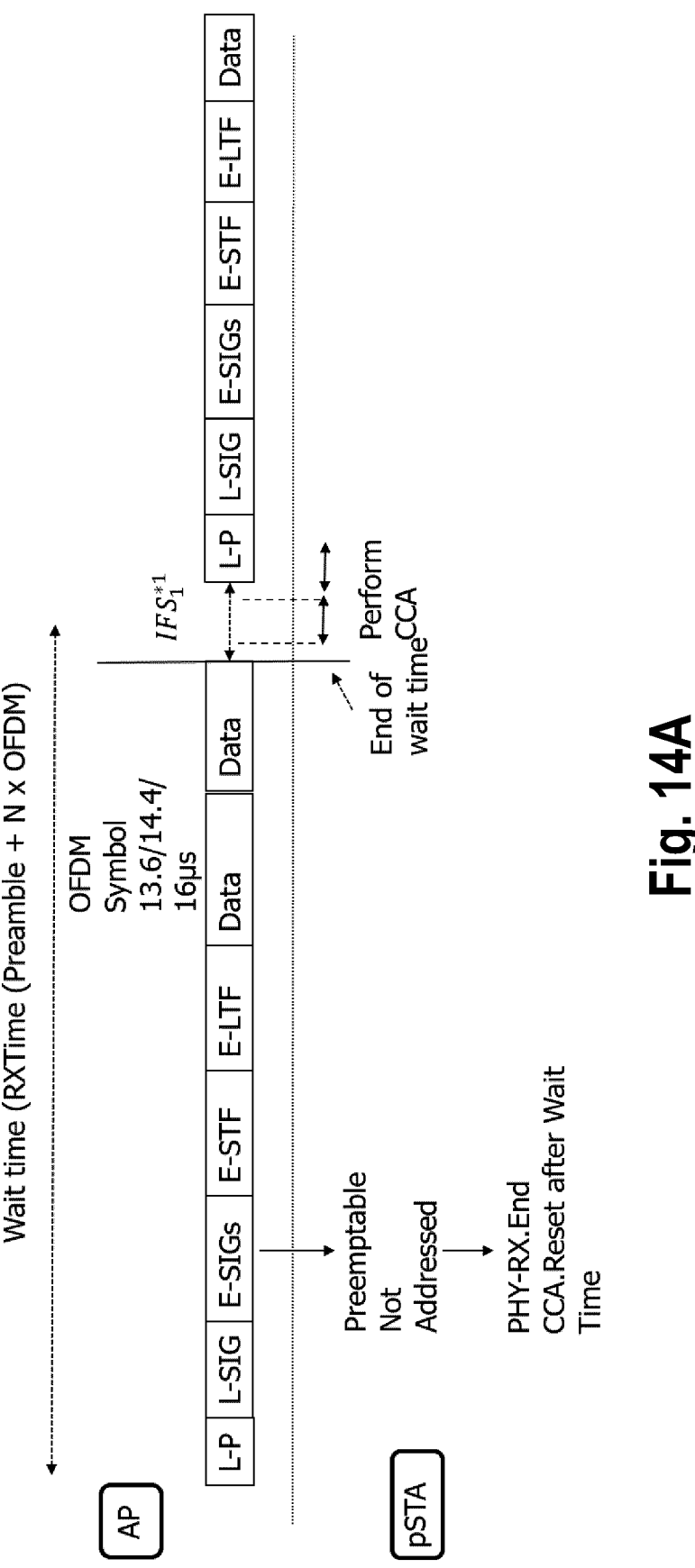
FIG. 14 shows diagrams illustrating pSTA clear channel assessment (CCA) and behavior in case of a truncation (FIG. 14A) or no truncation (FIG. 14B) after N OFDM symbols.
Figure 14B:
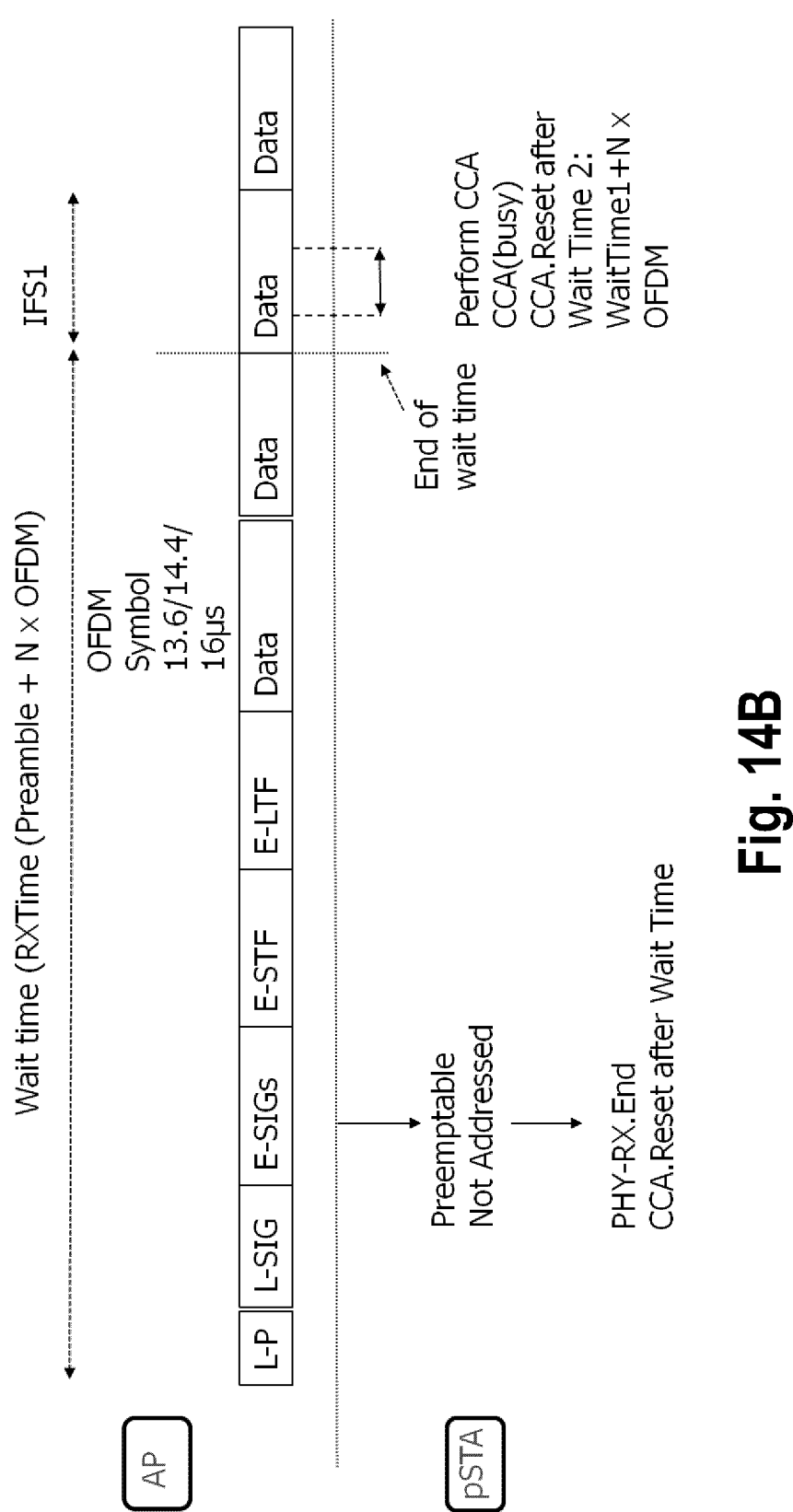

The changes described above are inflicted in a modified receiver diagram showing an enhanced receiver procedure depicted in FIG. 13 within the box marked with (X). This is shown in more detail in FIG. 14 in a truncation and no truncation case, respectively. In an embodiment it is fore-seen to keep a reference to the start of the PPDU in order to ensure the correct listening times. However it is also pos-sible to only keep a marker to the last potential truncation time as described by the Equation (1). FIG. 14A shows pSTA clear channel assessment (CCA) and behavior in case of a truncation after N OFDM symbols. FIG. 14B shows pSTA CCA and behavior in case of no truncation after N OFDM symbols.

Also, with respect to FIG. 13, the pSTA may be required to listen to the pPPDU for the estimated number of symbols. If a premature loss of transmission occurs it should reset its PHY CCA rather than issue a PHY-RX END Carrier Lost. In other words, it disregards the wait time corresponding to the expected duration of the PPDU, resets its PHY CCA to idle and continues listening to the medium. This is the behavior depicted on branch (Y) of the FIG. 9. This behavior should however be limited to STAs directly involved, i.e. pSTA and sSTAs. This is because STAs that only perform physical carrier sense on the link and are not expecting RTA traffic, should be prevented from accessing the channel after a premature stop and thus should continue keeping the CCA to busy. This is particularly important for Scenario 3, in which the pPPDU may not be heard by STAs and collisions could occur. Thus. pSTAs should be confirmed to be eligible to participate in the preemption e.g., they satisfy the trun-cation condition, mentioned above.

One way to enforce this restriction and enable pSTAs to determine that these are eligible to participate in the pre-emption, as provided in an embodiment, is to send the initial preemptable PPDUs in a PPDU format with STA ID indi-cation within a signaling field contained in the preamble, e.g., SIG-B, allowing both sSTA and pSTA to identify themselves as intended recipients based on the preamble information. On the other hand, this PPDU only carries payload information for sSTA. Thus, within the user specific information field of the SIG, resource allocation should be specified for sSTA, whereas no resource allocation is speci-fied for pSTA.

Figure 15:
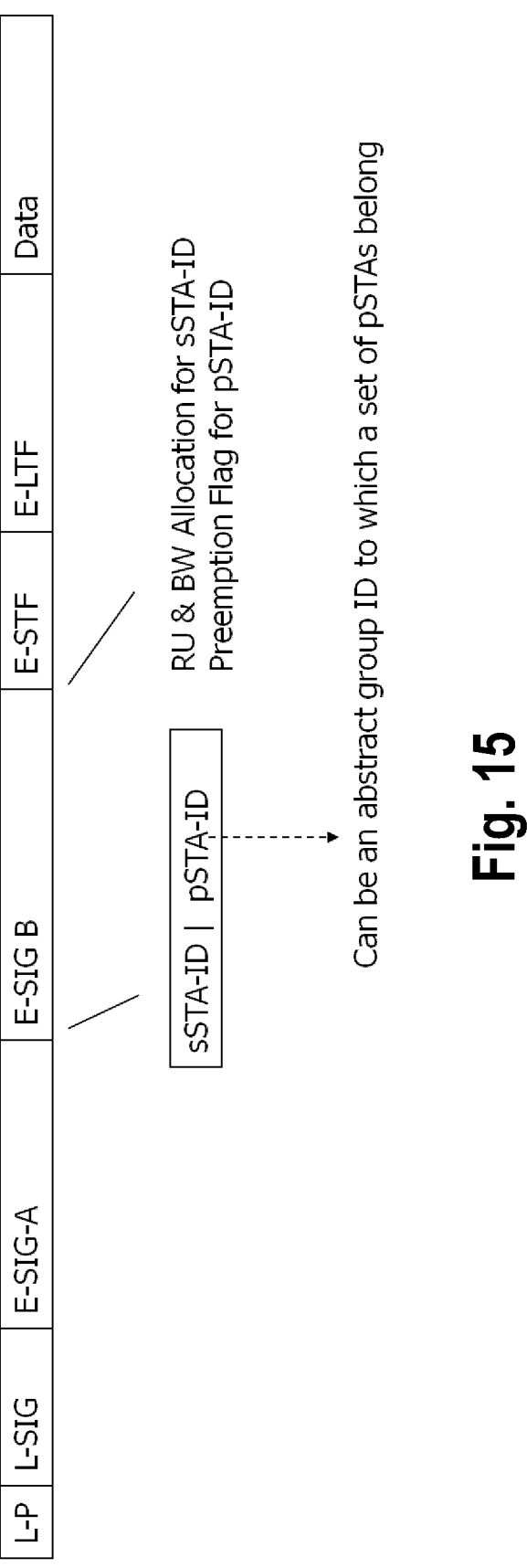
FIG. 15 shows a diagram illustrating sPPDU format with sSTA and pSTA ID indication.

Alternatively, only a preemptable indication or a resource allocation with preemptable indication can be specified within the user fields of the preamble corresponding to the pSTA. This is to indicate that the PPDU contains no payload for pSTA but a preemptive data exchange with pSTA may follow. Additional preemption related information may be included in the user field corresponding to the pSTA in the preamble, including a granularity of a potential truncation, i.e., number of OFDM symbols or STA ID, identifying the pSTA or an abstract identifier that only indicates one set of potential pSTAs, to which the pSTA for which the truncation is performed, belongs. An implication of this can be that an MU PPDU format is used even when original transmission is for only one intended STA. Naturally, this type of PPDU format can be used for MU PPDU as well, where similarly the set of sSTAs that are addressed are indicated the resource allocations that will be used, whereas for the pSTA a STA ID or abstract STA ID is associated to no resource allocation and/or a mere preemptive flag. FIG. 15 shows a diagram illustrating sPPDU format with sSTA and pSTA ID indica-tion.

On the MAC side, one solution is to define a low latency traffic session, informing both the AP and the pSTA of the existence of a high priority low latency traffic with strict latency requirements, and which may require preemption of PPDUs from/to other STAs. This can be established between an AP and potential pSTA, be defined as active until deleted and extend over multiple TXOPs. In this case only pSTAs with allocation ID (AID) being part of the active RTA are allowed/required to reset the intra-BSS NAV immediately after a premature termination of a PPDU, if the PPDU was sent with indication that is prone to preemptive stop. Spe-cific parameters such as granularity of the truncation, frag-mentation or carrier sense requirements from an AP as well as latency or periodicity requirements form the pSTA RA (receiver address) traffic can be negotiated at the setup of this RTA session.

In this context, an RTA session (also called low latency service session or preemption session) shall be understood as a period of time in which the pSTA has high priority low latency traffic to be exchanged with the AP. Parameters of the traffic requirements (like latency requirements may be exchanged, and based on these parameters such as truncation granularity can be decided.

Figure 17:
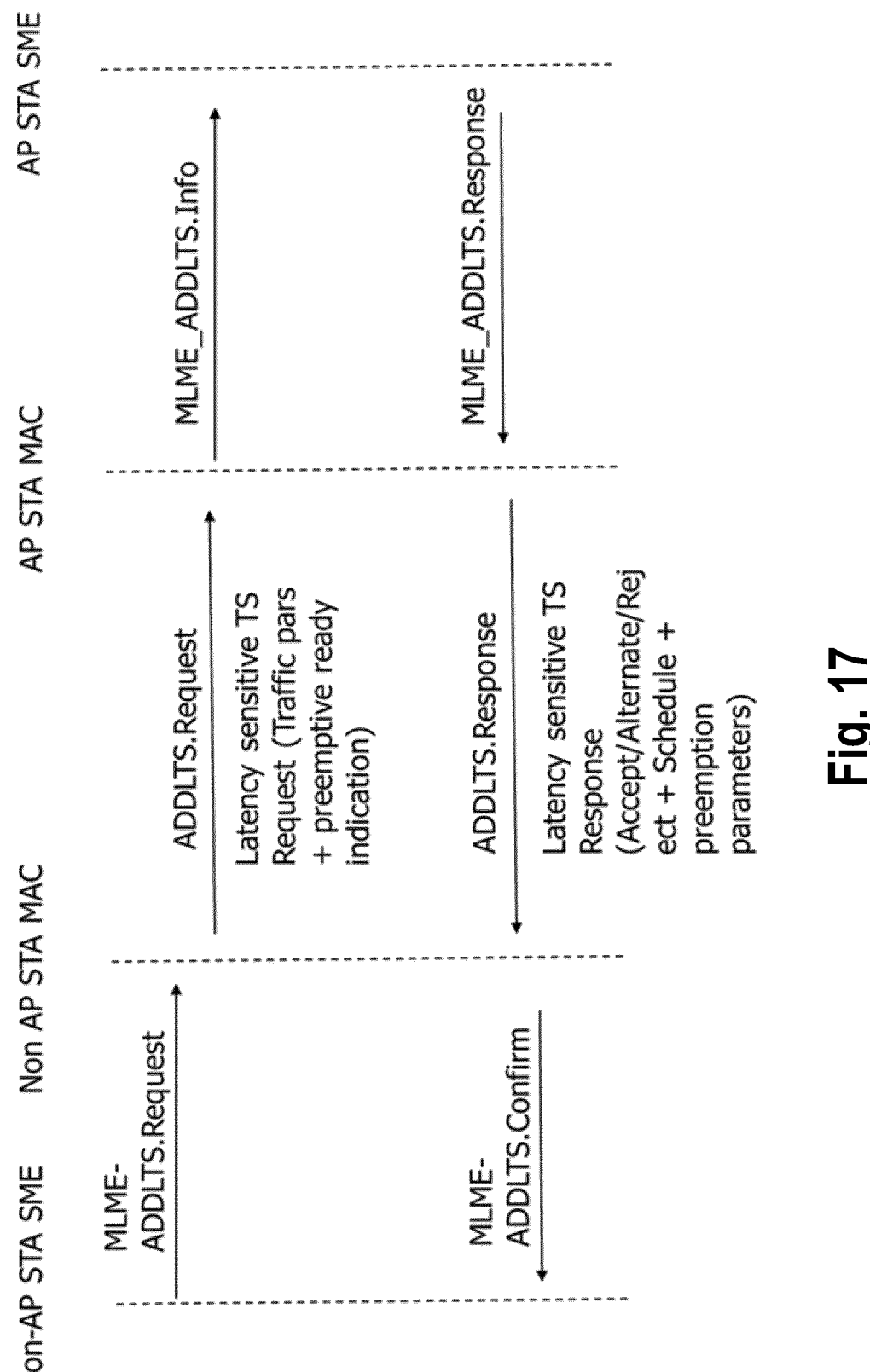
FIG. 17 shows a diagram illustrating the operation of a session in which a non-AP station initiates a low latency traffic session.

Another embodiment deals with establishing low latency sensitive traffic stream (LLSTS or LLTS) sessions to inform about the low latency traffic stream characteristics and preemption parameters. In one implementation of this embodiment a non-AP STA having low latency sensitive traffic may establish a low latency traffic session with the AP with which it is associated. FIG. 17 shows a diagram that illustrates the operation of such a session.

When setting up such a session the non-AP STA (having a station management entity (SME) and a MAC) informs its counterpart of the traffic characteristics (e.g., periodicity, duration) and requirements (e.g., in points of data rate and latency bounds). Furthermore, it may inform the AP (having a SME and a MAC) that it is preemption-ready. In this case, it may additionally indicate which preemption related parameters it can support, e.g., if it can continuously or only periodically listen during the reception of a PPDU, how often it can perform CCA during a PPDU). Including these parameters within the latency traffic session request is only one possible implementation. An alternative is to indicate preemption capability and parameters within fields of the capability elements that are exchanged between the STA and AP to which it is associated.

The AP responds to the latency traffic session request with an acceptance/rejection or suggestion for alternate param-eters. Specifically regarding preemption, the AP may indi-cate if, in order to satisfy the traffic requirements in point of latency, it may resort to truncation of ongoing PPDUs, towards STAs other than the LLTS requester. Furthermore, in case truncations may be performed, it also indicates parameters of the truncations, e.g. a possible truncation granularity, i.e., after how many OFDM symbols a trunca-tion may be performed or a set of possible values, out of which the exact one to be used is indicated in the preamble of the potentially truncatable PPDU. A schedule can be present within the response to the requester STA, which signals specific intervals in which the latency sensitive traffic stream may be transmitted and/or when an AP can request updates. Furthermore, it can indicate whether the potential truncations are possible within the specified time intervals corresponding to these schedules or also outside of these. Specifying time intervals and ensuring truncation that may only be performed within the specified intervals can contribute to improving the power saving behavior of the pSTAs. Otherwise, the requesting pSTAs should commit to continuously listening to PPDUs belonging to other STAs, constantly evaluating if intentional truncations are performed and furthermore verifying if the identifiers of the follow up transmissions are corresponding to themselves.

The specific schedules and periodicity can be defined at the Low Latency Sensitive Traffic Stream (LLSTS or LLTS) setup. Alternatively, these can be further announced by the AP, within the setup and/or announcement of scheduling intervals for particular STAs, e.g. individual or broadcast target wake up times. In order to allow the pSTA to determine these intervals, the AP assigns an allocation ID, to which the LLTS identifier together with identifiers of the pSTA and AP are mapped. In case of broadcast wake up time intervals, an AP may indicate, within control frames carrying setup or update configuration information, that transmissions during these intervals can be potentially truncated.

In case a low latency sensitive traffic has been established between the AP and pSTA, the traffic stream identifier of this traffic together with identifiers of the AP and pSTA will be contained in the PPDU transmitted after the truncation.

Similarly, in another implementation an AP being informed from its upper layers of the existence of a low latency sensitive traffic towards a non-AP STA may establish a low latency-sensitive session with the respective STA. In this case, if the AP can include within the LLSTSReservation, an indication of whether preemption is supported and with which parameters, e.g. granularity. Subsequently, the pSTA confirms whether it accepts the parameters, e.g. if it is capable of periodic listening with given OFDM granularity. The low latency sensitive traffic information and low latency sensitive traffic can be setup by reusing with some modifications the TS setup mechanisms defined in the IEEE 802.11 standards.

Another embodiment enables truncations only in specific time intervals, where pSTAs are known to be awake and able to process a follow-up transmission. In this embodiment traffic stream parameters such as periodicity or latency requirements, can be exchanged by the pSTA and AP, e.g. by a regular TS. However, preemption parameters are exchanged and activated within specifically defined service periods, i.e., time intervals in which more targeted data exchanges between the AP and particular pSTAs are performed. An example of such a time interval is a TWT SP (target wake time service period).

The pSTA and AP establish an interval in which potential transmissions corresponding to the low latency traffic characteristics can be performed. Within the setup phase, characteristics of a data exchange between the AP and pSTA can be negotiated, e.g., if the transmission from pSTA should be preceded by a trigger from the AP. Furthermore, preemption related parameters as described above, e.g. granularity, can be chosen according to the latency traffic characteristics, and the capabilities of both AP and pSTA and other traffic requirements from within the BSS. The chosen parameters can be further negotiated between the AP and pSTA. During an established TWT SP, the pSTA also commits to being awake thus capable of hearing PPDUs exchanged over the medium on a set of negotiated links. If, during a time interval established in this manner, the pSTA observes an early termination of a PPDU, the pSTA is allowed to set the PHY-CCA to idle, immediately after determining the truncation and subsequently follows the further rules defined within the respective time interval (i.e., waits for a follow-up PPDU from the AP, containing preemptive data unit, or a frame triggering the transmission from the pSTA or starts a transmission directly).

Several further solutions can also be defined on MAC side, more specifically at MAC frame and A-MPDU level. They may be weaker than the solutions defined on the PHY side, since the payload of the PPDU can be sent with higher MCS than the preamble and may not be correctly decoded by other STAs if channel conditions do not allow. Possible embodiments of a solution are explained in the following.

According to one embodiment, within the header of the MPDU an indication of preemptable is provided. In this case a STA (possibly involved in an RTA session) will continue decoding the packet even if not intended for itself and will search for an indication of preemption.

According to another embodiment the receiver address (RA) of MPDUs is sent within a preemptable PPDU as broadcast and a newly designed frame is provided in the beginning of the A-MPDU. This can be a latent trigger frame with AIDs of the sSTA and pSTA and indicating how to further interpret the content of the A-MPDU, i.e., user information for sSTA and only preemptable information and potential control information in case of a preemption for pSTA e.g., earliest time of a preemption. The information within this is only valid in case of a premature ending of the PPDU, in which case pSTAs check if their AIDs correspond to the ones within the frame. If yes, they are allowed to access the channel to send the required updates.

Figure 16:
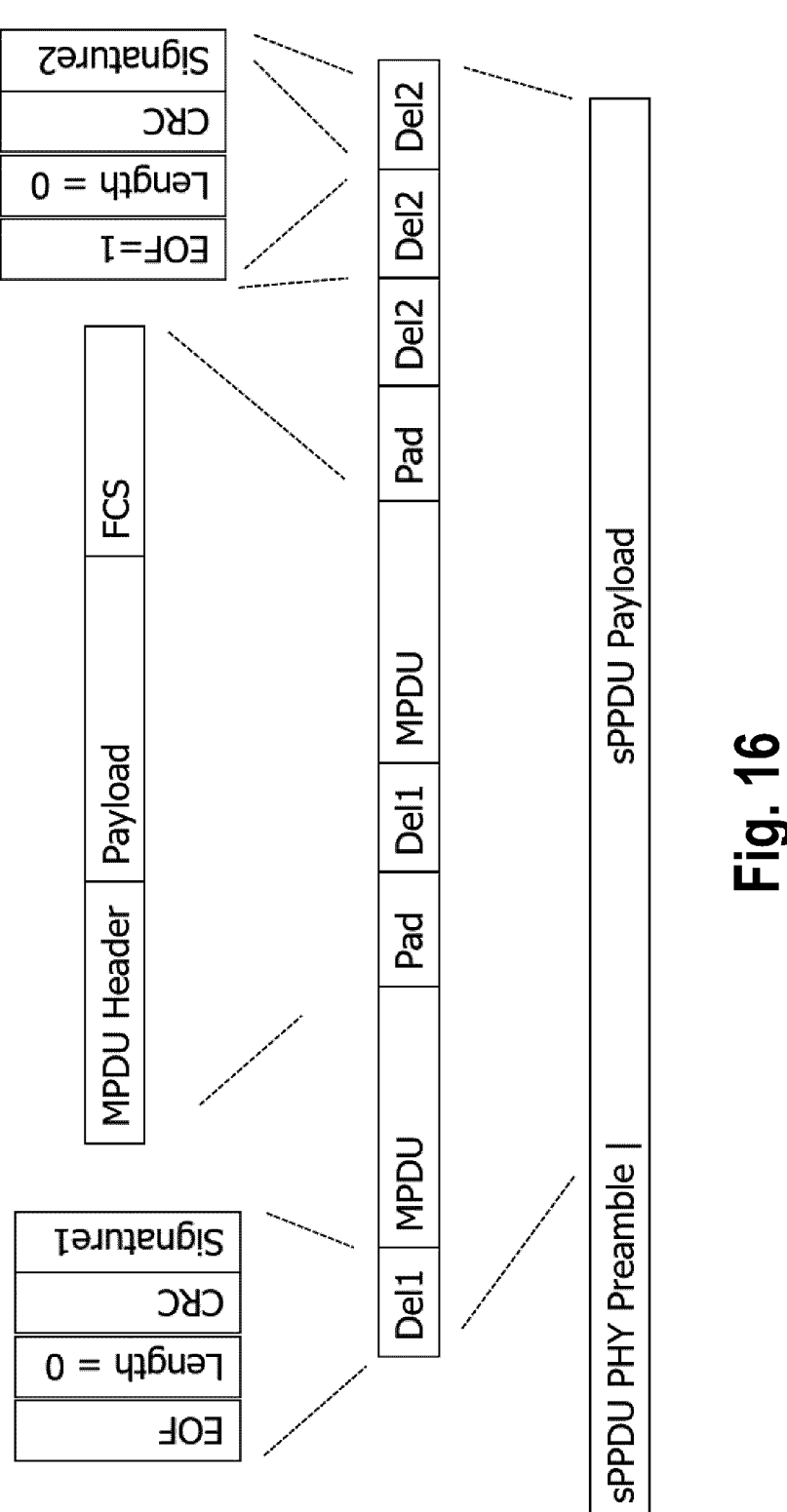
FIG. 16 shows a diagram illustrating the payload format of a truncatable PPDU with a new delimiter structure to indicate preemption.

According to another embodiment an indication of preemption may be defined at the end of the MPDUs in the form of delimiters with a specific structure (e.g. a specific signature). So far, the role of a delimiter is simply to allow a STA to determine the boundaries of the MPDUs within an A-MPDU such that an MPDU can be decoded even if a previous one has failed. Thus, a common signature is enough for this purpose. However, for preemption, an easy way to indicate a preemption and potentially also the intended pSTA can be to use a repetition of delimiters with indicated length=0, EOF=1. A signature different than the currently used ASCII character N may be used to simply indicate a premature stop, whereas a set of signatures may be defined and used to further indicate a pSTA ID which is intended for the truncation. FIG. 16 shows a diagram illustrating the payload format of a truncatable PPDU with a new delimiter structure to indicate preemption. To maintain legacy compatibility, it is enough to only change the signature2 of the delimiters Del2 at the end of the A-MPDU marking the truncation compared to the signature1 in the delimiters Del1 in between the MPDUs.

Alternatively, in another embodiment a control frame or a control field may be defined at the end of the MPDUs. One example may be a variant of a CF_End frame, however with a modified RA. The RA may correspond in this case to the pSTA.

Advantages of the present disclosure include one or more of improved latency for RTA station having higher priority traffic than an ongoing transmission, ensuring correct processing at an intended recipient of a preemptive transmission (i.e., a STA for which an ongoing transmission is prematurely terminated), avoiding medium waste due to deafness problem, and improved channel access parameter setting.

Thus, the foregoing discussion discloses and describes merely exemplary embodiments of the present disclosure.

As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits or circuitry. A circuit is a structural assemblage of electronic components including conventional circuit elements, integrated circuits including application specific integrated circuits, standard integrated circuits, application specific standard products, and field programmable gate arrays. Further, a circuit includes central processing units, graphics processing units, and microprocessors which are programmed or configured according to software code. A circuit does not include pure software, although a circuit includes the above-described hardware executing software. A circuit or circuitry may be implemented by a single device or unit or multiple devices or units, or chipset(s), or processor(s).

It follows a list of further embodiments of the disclosed subject matter:

1. First communication device configured to communicate with a second communication device, the first communication device comprising circuitry configured to listen to an ongoing data exchange between the second communication device and a third communication device on a wireless channel, estimate from a packet comprising a data unit transmitted during the ongoing data exchange to the third communication device the reception duration of the data unit, determine, before the end of the estimated reception duration of the data unit, if the transmission of the data unit is truncated and/or if a truncation condition is met, the reception duration indicating the time of reception of the data unit by the third communication device if the data unit were not truncated, and, if the transmission of the data unit is truncated and/or if a truncation condition is met, receive a preemptive data unit from the second communication device or transmit a preemptive data unit to the second communication device.

2. First communication device as defined in any one of the preceding embodiments, wherein the circuitry is configured to assess if the channel is idle or busy before the estimated reception duration.

3. First communication device as defined in any one of the preceding embodiments, wherein the circuitry is configured to periodically listen, if the channel is busy, to the channel to determine if the transmission of the data unit is truncated and/or if a truncation condition is met.

4. First communication device as defined in any one of the preceding embodiments, wherein the circuitry is configured to verify that the data unit, which caused the channel to be busy after a determined truncation and before the estimated reception duration, contains a receiver address of the first communication device and/or an identifier corresponding to a low latency sensitive traffic session established between the first and the second communication device.

5. First communication device as defined in any one of embodiments 2 to 4, wherein the circuitry is configured to periodically listen to the channel at time intervals determined by the granularity of the truncation of the data transmission, an interframe space and/or the estimated reception duration of the transmitted data unit.

6. First communication device as defined in embodiment 5, wherein the circuitry is configured to determine the granularity of the truncation of the data transmission from information included in the preamble of the data unit transmitted to the second communication device or from a parameter set that was negotiated between the first communication device and the third communication device when establishing a low latency service session.

7. First communication device as defined in any one of embodiments 2 to 6, wherein the circuitry is configured to periodically listen to the channel at time intervals corresponding to an integer multiple of the duration of an OFDM symbol included in the transmitted data unit.

8. First communication device as in any one of embodiments 2 to 7, wherein the circuitry is configured to perform a clear channel assessment when periodically listening to the channel.

9. First communication device as defined in any one of the preceding embodiments, wherein the circuitry is configured to use as truncation condition one or more of:

the first communication device is involved in an active low latency traffic session;

the first communication device is indicated in a PHY header of the data unit transmitted by the second communication device to the third communication device;

the first communication device is indicated in a MAC field of the data unit transmitted by the second communication device to the third communication device;

a truncation pattern within a PHY data unit and/or in-between MAC data units or after the MAC data units, transmitted by the second communication device to the third communication device, indicating an intentional truncation, is identified;

a truncation flag inside the preamble of the transmitted data unit, indicating that an intentional truncation can be applied to said transmitted data unit, is identified by the first communication device.

10. First communication device as defined in any one of the preceding embodiments, wherein the circuitry is configured to identify, in a data unit of the ongoing data exchange that contains one or more MAC data units only for the third communication device but not the first communication device, a device identifier identifying the first communication device and the third communication device as intended recipients of preamble information in a data unit of the ongoing data exchange, and receive a preemptive data unit from the second communication device or transmit a preemptive data unit to the second communication device if a device identifier has been identified and a truncation of the ongoing data exchange has been determined.

11. First communication device as defined in embodiment 10, wherein the circuitry is configured to identify in a data unit of the ongoing transmission a preemptable indication for the first communication device indicating that the ongoing transmission may be truncated and a preemptive data unit may be received from the second communication device or may be transmitted to the second communication device, and receive a preemptive data unit from the second communication device or transmit a preemptive data unit to the second communication device if a preemptable indication for the first communication device has been identified.

12. First communication device as defined in embodiment 10 or 11, wherein the circuitry is configured to identify in a data unit of the ongoing data exchange an empty resource allocation for the first communication device, and receive a preemptive data unit from the second communication device or transmit a preemptive data unit to the second communication device if an empty resource allocation for the first communication device has been identified.

13. First communication device as defined in embodiment 11 or 12, wherein the circuitry is configured to identify the preemptable indication and/or the resource allocation in a preamble of a data unit of the ongoing data exchange.

14. First communication device as defined in any one of the preceding embodiments, wherein the circuitry is configured to determine if data units from the second communication device to the third communication device contain an identifier corresponding to the identifier of an active preemptive low latency sensitive traffic session, established between the first communication device and the second communication device, or if the time of the ongoing transmission partially overlaps with an interval indicated in a low latency traffic session setup, established between the first communication device and the second communication device, or if the time of the ongoing transmission partially overlaps with an allocation period, with an identifier corresponding to the one established in a low latency session setup, or if the time of the ongoing transmission partially overlaps with a schedules interval defined with preemption indication, and reset a network allocation vector, NAV, and/or reevaluate if the channel is busy or idle before the estimated duration of the received data unit elapses if the first communication device is involved in active low latency traffic session (or active RTA session) and an intentional truncation is determined.

15. First communication device as defined in embodiment 14, wherein the circuitry is configured to transmit or receive data units to or from the second communication device, in case an intentional truncation is determined and parameters match the ones in the low latency traffic session establishment, before the expected duration of the data unit elapses.

16. First communication device as defined in embodiment 14 or 15, wherein the circuitry is configured to setup in a phase previous to the ongoing transmission a preemptive low latency traffic session between the first communication device and the second communication device, wherein one or more of information regarding traffic characteristics, preemption capabilities and preemption parameters is exchanged and/or acknowledged.

17. First communication device as defined in any one of embodiments 14 to 16, wherein the circuitry is configured to negotiate or indicate capability for one or more truncation related parameters including one or more of granularity of truncation, time intervals within which data units are more prone to be truncated, identifiers to be used for the active low latency traffic session identifying the first communication device as potential recipient of a follow-up transmission after truncation.

18. First communication device as defined in any one of the preceding embodiments, wherein the circuitry is configured to identify in a header of a MAC protocol data unit, MPDU, or in the preamble of a PHY protocol data unit, PPDU, of the ongoing data exchange a preemptable indication for the first communication device indicating that the ongoing data exchange may be truncated, and decode received data units to identify a truncation notification if a preemptable indication has been identified.

19. First communication device as defined in any one of the preceding embodiments, wherein the circuitry is configured to identify if a receiver address of MAC protocol data units, MPDUs, of the ongoing data exchange is defined as broadcast or multicast, the multicast including an identifier of the first communication device and the transmitted data unit containing at least a MAC control frame, indicating the first communication device as potential receiver or transmitter of a preemptive data unit following an early termination of the ongoing data exchange, and receive a preemptive data unit from the second communication device or transmit a preemptive data unit to the second communication device.

20. First communication device as defined in any one of the preceding embodiments, wherein the circuitry is configured to identify a number and/or structure of delimiters after the MAC protocol data units, MPDUs, of the ongoing data exchange, said number and/or structure of delimiters representing a preemptable indication indicating that the ongoing transmission is intentionally truncated and/or an indication of an allocation or traffic identifier allowing the first communication device to identify itself as potential receiver or transmitter of a preemptive data unit, and receive a preemptive data unit from the second communication device or transmit a preemptive data unit to the second communication device if the number and/or structure of delimiters has been identified.

21. First communication device as defined in any one of the preceding embodiments, wherein the circuitry is configured to identify a control frame or control field in, or at the end, of a MAC protocol data unit, MPDU, of the ongoing data exchange, said control frame or control field including or representing a preemptable indication for the first communication device indicating that the ongoing data exchange may be truncated or a preemptive data unit may be received from the second communication device or may be transmitted to the second communication device, and receive a preemptive data unit from the second communication device or transmit a preemptive data unit to the second communication device if the control frame or control field has been identified.

22. Second communication device configured to communicate with a first and third communication device, the second communication device comprising circuitry configured to perform an ongoing data exchange with the third communication device on a wireless channel, truncate the transmission of a data unit to the third communication device, and, before the end of the estimated reception duration, initiate reception of a preemptive data unit from the first communication device or transmission of a preemptive data unit to the first communication device, the reception duration indicating the time of reception of the data unit by the third communication device if the data unit were not truncated.

23. Second communication device as defined in embodiment 22, wherein the circuitry is configured to indicate preemption capability and/or establish preemptive low latency sessions and/or indicate or negotiate preemption parameters with a first communication device.

24. Second communication device as defined in embodiment 22 or 23, wherein the circuitry is configured to include in the data unit, which caused the channel to be busy after a determined truncation and before the estimated reception duration, a receiver address of the first communication device and/or an identifier corresponding to a low latency sensitive traffic session established between the first and the second communication device.

25. Second communication device as in any one of embodiments 22 to 24, wherein the circuitry is configured to include, in a data unit of the ongoing data exchange that contains one or more MAC data frames only for the third communication device but not the first communication device, a device identifier identifying the first communication device and the third communication device as intended recipients of preamble information in a data unit of the ongoing data exchange, and receive a preemptive data unit from the first communication device or transmit a preemptive data unit to the first communication device if a device identifier has been identified and a truncation of the ongoing data exchange has been determined.

26. Second communication device as defined in any one of embodiments 22 to 25, wherein the circuitry is configured to include in a data unit of the ongoing transmission a preemptable indication indicating that the ongoing transmission may be truncated and a preemptive data unit may be received from the first communication device or may be transmitted to the first communication device, and receive a preemptive data unit from the first communication device or transmit a preemptive data unit to the first communication device if a preemptable indication for the first communication device has been identified.

27. Second communication device as defined in any one of embodiments 22 to 26, wherein the circuitry is configured to include in a data unit of the ongoing data exchange information fields indicating the third communication device and a corresponding resource allocation and the first communication device and a corresponding empty resource allocation or to indicate within the user field corresponding to the first communication device an empty resource allocation or to mark within the user field corresponding to the first communication device reserved or empty resource allocation, and receive a preemptive data unit from the first communication device or transmit a preemptive data unit to the first communication device if an empty resource allocation for the first communication device has been identified.

28. Second communication device as defined in embodiment 26 or 27, wherein the circuitry is configured to include the preemptable indication and/or the resource allocation in a preamble of a data unit of the ongoing data exchange.

29. Second communication device as defined in any one of embodiments 22 to 28, wherein the circuitry is configured to include in data units from the second communication device to the third communication device an identifier corresponding to the identifier of an active preemptive low latency sensitive traffic session, established between the first communication device and the second communication device or if the time of the ongoing transmission partially overlaps with the interval indicated in a low latency traffic session setup, established between the first communication device and the second communication device.

30. Second communication device as defined in embodiment 29, wherein the circuitry is configured to setup in a phase previous to the ongoing transmission a preemptive low latency traffic session between the first communication device and the second communication device, wherein one or more of information regarding traffic characteristics, preemption capabilities and preemption parameters is exchanged and/or acknowledged.

31. Second communication device as defined in any one of embodiments 22 to 30, wherein the circuitry is configured to include, in a header of a MAC protocol data unit, MPDU, or in the preamble of a PHY protocol data unit, PPDU, of the ongoing data exchange a preemptable indication for the first communication device indicating that the ongoing data exchange may be truncated.

32. Second communication device as defined in any one of embodiments 22 to 31, wherein the circuitry is configured to define a receiver address of MAC protocol data units, MPDUs, of the ongoing data exchange as broadcast or multicast, the multicast including an identifier of the first communication device and the transmitted data unit containing at least a MAC control frame, indicating the first communication device as potential receiver or transmitter of a preemptive data unit following an early termination of the ongoing data exchange.

33. Second communication device as defined in any one of embodiments 22 to 32, wherein the circuitry is configured to include a number and/or structure of delimiters after the MAC protocol data units, MPDUs, of the ongoing data exchange, said number and/or structure of delimiters representing a preemptable indication indicating that the ongoing transmission is intentionally truncated and/or an indication of an allocation or traffic identifier allowing the first communication device to identify itself as potential receiver or transmitter of a preemptive data unit.

34. Second communication device as defined in any one of embodiments 22 to 33, wherein the circuitry is configured to include a control frame or control field in or at the end of a MAC protocol data unit, MPDU, of the ongoing data exchange, said control frame or control field including or representing a preemptable indication for the first communication device indicating that the ongoing data exchange may be truncated or a preemptive data unit may be received from the second communication device or may be transmitted to the second communication device.

35. First communication method for communicating with a second communication device, the first communication method comprising listening to an ongoing data exchange between the second communication device and a third communication device on a wireless channel, estimating from a packet comprising a data unit transmitted during the ongoing data exchange to the third communication device the reception duration of the data unit, determining, before the end of the estimated reception duration of the data unit, if the transmission of the data unit is truncated and/or if a truncation condition is met, the reception duration indicating the time of reception of the data unit by the third communication device if the data unit were not truncated, and, if the transmission of the data unit is truncated and/or if a truncation condition is met, receiving a preemptive data unit from the second communication device or transmit a preemptive data unit to the second communication device.

36. Second communication method for communicating with a first and third communication device, the second communication method comprising performing an ongoing data exchange with the third communication device on a wireless channel, truncating the transmission of a data unit to the third communication device, and, before the end of the estimated reception duration, initiating reception of a preemptive data unit from the first communication device or transmission of a preemptive data unit to the first communication device, the reception duration indicating the time of reception of the data unit by the third communication device if the data unit were not truncated.

37. A non-transitory computer-readable recording medium that stores therein a computer program product, which, when executed by a processor, causes the method according to embodiment 35 or 36 to be performed.

38. A computer program comprising program code means for causing a computer to perform the steps of said method according to embodiment 35 or 36 when said computer program is carried out on a computer.

The invention claimed is:

1. A first communication device configured to communicate with a second communication device, the first communication device comprising circuitry configured to listen to an ongoing data exchange between the second communication device and a third communication device on a wireless channel, estimate from a packet comprising a data unit transmitted during the ongoing data exchange to the third communication device a reception duration of the data unit, determine, before the end of the estimated reception duration of the data unit, if the transmission of the data unit is truncated and/or if a truncation condition is met, the estimated reception duration indicating a time of reception of the data unit by the third communication device if the data unit were not truncated, and, if the transmission of the data unit is truncated and/or if a truncation condition is met, receive a preemptive data unit from the second communication device or transmit a preemptive data unit to the second communication device.

2. The first communication device as claimed in claim 1, wherein the circuitry is configured to assess if the channel is idle or busy before the estimated reception duration and/or to periodically listen, if the channel is busy, to the channel to determine if the transmission of the data unit is truncated and/or if a truncation condition is met.

3. The first communication device as claimed in claim 1, wherein the circuitry is configured to verify that the data unit, which caused the channel to be busy after a determined truncation and before the estimated reception duration, contains a receiver address of the first communication device and/or an identifier corresponding to a low latency sensitive traffic session established between the first and the second communication device.

4. The first communication device as claimed in claim 2, wherein the circuitry is configured to periodically listen to the channel at time intervals determined by the granularity of the truncation of the data transmission, an interframe space and/or the estimated reception duration of the transmitted data unit, and/or to determine the granularity of the truncation of the data transmission from information included in the preamble of the data unit transmitted to the second communication device or from a parameter set that was negotiated between the first communication device and the third communication device when establishing a low latency service session, and/or to periodically listen to the channel at time intervals corresponding to an integer multiple of the duration of an OFDM symbol included in the transmitted data unit.

5. The first communication device as claimed in claim 1, wherein the circuitry is configured to use as truncation condition one or more of:

the first communication device is involved in an active low latency traffic session;

the first communication device is indicated in a PHY header of the data unit transmitted by the second communication device to the third communication device;

the first communication device is indicated in a MAC field of the data unit transmitted by the second communication device to the third communication device;

a truncation pattern within a PHY data unit and/or in-between MAC data units or after the MAC data units, transmitted by the second communication device to the third communication device, indicating an intentional truncation, is identified;

a truncation flag inside the preamble of the transmitted data unit, indicating that an intentional truncation can be applied to said transmitted data unit, is identified by the first communication device.

6. The first communication device as claimed in claim 1, wherein the circuitry is configured to identify, in a data unit of the ongoing data exchange that contains one or more MAC data units only for the third communication device but not the first communication device, a device identifier identifying the first communication device and the third communication device as intended recipients of preamble information in a data unit of the ongoing data exchange, and receive a preemptive data unit from the second communication device or transmit a preemptive data unit to the second communication device if a device identifier has been identified and a truncation of the ongoing data exchange has been determined.

7. The first communication device as claimed in claim 5, wherein the circuitry is configured to identify in a data unit of the ongoing transmission a preemptable indication for the first communication device indicating that the ongoing transmission may be truncated and a preemptive data unit may be received from the second communication device or may be transmitted to the second communication device, and receive a preemptive data unit from the second communication device or transmit a preemptive data unit to the second communication device if a preemptable indication for the first communication device has been identified.

8. The first communication device as claimed in claim 5, wherein the circuitry is configured to identify in a data unit of the ongoing data exchange an empty resource allocation for the first communication device, and receive a preemptive data unit from the second communication device or transmit a preemptive data unit to the second communication device if an empty resource allocation for the first communication device has been identified.

9. The first communication device as claimed in claim 1, wherein the circuitry is configured to determine if data units from the second communication device to the third communication device contain an identifier corresponding to the identifier of an active preemptive low latency sensitive traffic session, established between the first communication device and the second communication device, or

22 if the time of the ongoing transmission partially overlaps with an interval indicated in a low latency traffic session setup, established between the first communication device and the second communication device, or if the time of the ongoing transmission partially overlaps with an allocation period, with an identifier corresponding to the one established in a low latency session setup, or if the time of the ongoing transmission partially overlaps with a schedules interval defined with preemption indication, and reset a network allocation vector, NAV, and/or reevaluate if the channel is busy or idle before the estimated duration of the received data unit elapses if the first communication device is involved in active low latency traffic session and an intentional truncation is determined.

10. The first communication device as claimed in claim 9, wherein the circuitry is configured to transmit or receive data units to or from the second communication device, in case an intentional truncation is determined and parameters match the ones in the low latency traffic session establishment, before the expected duration of the data unit elapses, and/or to setup in a phase previous to the ongoing transmission a preemptive low latency traffic session between the first communication device and the second communication device, wherein one or more of information regarding traffic characteristics, preemption capabilities and preemption parameters is exchanged and/or acknowledged, and/or to negotiate or indicate capability for one or more truncation related parameters including one or more of granularity of truncation, time intervals within which data units are more prone to be truncated, identifiers to be used for the active low latency traffic session identifying the first communication device as potential recipient of a follow-up transmission after truncation.

11. The first communication device as claimed in claim 1, wherein the circuitry is configured to identify in a header of a MAC protocol data unit, MPDU, or in the preamble of a PHY protocol data unit, PPDU, of the ongoing data exchange a preemptable indication for the first communication device indicating that the ongoing data exchange may be truncated, and decode received data units to identify a truncation notification if a preemptable indication has been identified.

12. The first communication device as claimed in claim 1, wherein the circuitry is configured to identify if a receiver address of MAC protocol data units, MPDUs, of the ongoing data exchange is defined as broadcast or multicast, the multicast including an identifier of the first communication device and the transmitted data unit containing at least a MAC control frame, indicating the first communication device as potential receiver or transmitter of a preemptive data unit following an early termination of the ongoing data exchange, and receive a preemptive data unit from the second communication device or transmit a preemptive data unit to the second communication device.

13. The first communication device as claimed in claim 1, wherein the circuitry is configured to identify a number and/or structure of delimiters after the MAC protocol data units, MPDUs, of the ongoing data exchange, said number and/or structure of delimiters representing a preemptable indication indicating that the ongoing transmission is intentionally truncated and/or an indication of an allocation or traffic identifier allowing the first communication device to identify itself as potential receiver or transmitter of a preemptive data unit, and receive a preemptive data unit from the second communication device or transmit a preemptive data unit to the second communication device if the number and/or structure of delimiters has been identified.

14. The first communication device as claimed in claim 1, wherein the circuitry is configured to identify a control frame or control field in, or at the end, of a MAC protocol data unit, MPDU, of the ongoing data exchange, said control frame or control field including or representing a preemptable indication for the first communication device indicating that the ongoing data exchange may be truncated or a preemptive data unit may be received from the second communication device or may be transmitted to the second communication device, and receive a preemptive data unit from the second communication device or transmit a preemptive data unit to the second communication device if the control frame or control field has been identified.

15. A second communication device configured to communicate with a first and third communication device, the second communication device comprising circuitry configured to perform an ongoing data exchange with the third communication device on a wireless channel, truncate the transmission of a data unit to the third communication device, and, before the end of an estimated reception duration, initiate reception of a preemptive data unit from the first communication device or transmission of a preemptive data unit to the first communication device, the estimated reception duration indicating a time of reception of the data unit by the third communication device if the data unit were not truncated.

16. The second communication device as claimed in claim 15, wherein the circuitry is configured to indicate preemption capability and/or establish preemptive low latency sessions and/or indicate or negotiate preemption parameters with a first communication device.

17. The second communication device as claimed in claim 15, wherein the circuitry is configured to include in the data unit, which caused the channel to be busy after a determined truncation and before the estimated reception duration, a receiver address of the first communication device and/or an identifier corresponding to a low latency sensitive traffic session established between the first and the second communication device, and/or to include in a data unit of the ongoing data exchange that contains one or more MAC data frames only for the third communication device but not the first communication device, a device identifier identifying the first communication device and the third communication device as intended recipients of preamble information in a data unit of the ongoing data exchange, and/or to include in a data unit of the ongoing transmission a preemptable indication indicating that the ongoing transmission may be truncated and a preemptive data unit may be received from the first communication device or may be transmitted to the first communication device, and/or to include in a data unit of the ongoing data exchange information fields indicating the third communication device and a corresponding resource allocation and the first communication device and a corresponding empty resource allocation and/or a preemption indication, and/or to include in data units from the second communication device to the third communication device an identifier corresponding to the identifier of an active preemptive low latency sensitive traffic session, established between the first communication device and the second communication device or if the time of the ongoing transmission partially overlaps with the interval indicated in a low latency traffic session setup, established between the first communication device and the second communication device, and/or to setup in a phase previous to the ongoing transmission a preemptive low latency traffic session between the first communication device and the second communication device, wherein one or more of information regarding traffic characteristics, preemption capabilities and preemption parameters is exchanged and/or acknowledged, and/or to include, in a header of a MAC protocol data unit, MPDU, or in the preamble of a PHY protocol data unit, PPDU, of the ongoing data exchange a preemptable indication for the first communication device indicating that the ongoing data exchange may be truncated, and/or to define a receiver address of MAC protocol data units, MPDUs, of the ongoing data exchange as broadcast or multicast, the multicast including an identifier of the first communication device and the transmitted data unit containing at least a MAC control frame, indicating the first communication device as potential receiver or transmitter of a preemptive data unit following an early termination of the ongoing data exchange, and/or to include a number and/or structure of delimiters after the MAC protocol data units, MPDUs, of the ongoing data exchange, said number and/or structure of delimiters representing a preemptable indication indicating that the ongoing transmission is intentionally truncated and/or an indication of an allocation or traffic identifier allowing the first communication device to identify itself as potential receiver or transmitter of a preemptive data unit, and/or to include a control frame or control field in or at the end of a MAC protocol data unit, MPDU, of the ongoing data exchange, said control frame or control field including or representing a preemptable indication for the first communication device indicating that the ongoing data exchange may be truncated or a preemptive data unit may be received from the second communication device or may be transmitted to the second communication device.

18. A first communication method for communicating with a second communication device, the first communication method comprising listening to an ongoing data exchange between the second communication device and a third communication device on a wireless channel, estimating from a packet comprising a data unit transmitted during the ongoing data exchange to the third communication device a reception duration of the data unit, determining, before the end of the estimated reception duration of the data unit, if the transmission of the data unit is truncated and/or if a truncation condition is met, the estimated reception duration indicating a time of reception of the data unit by the third communication device if the data unit were not truncated, and, if the transmission of the data unit is truncated and/or if a truncation condition is met, receiving a preemptive data unit from the second communication device or transmit a preemptive data unit to the second communication device.

19. A second communication method for communicating with a first and third communication device, the second communication method comprising performing an ongoing data exchange with the third communication device on a wireless channel, truncating the transmission of a data unit to the third communication device, and, before the end of an estimated reception duration, initiating reception of a preemptive data unit from the first communication device or transmission of a preemptive data unit to the first communication device, the estimated reception duration indicating a time of reception of the data unit by the third communication device if the data unit were not truncated.

20. A non-transitory computer-readable recording medium that stores therein a computer program product, which, when executed by a processor, causes the method according to claim 18 or 19 to be performed.

* * * * *